(12) United States Patent
Lindacher et al.

(10) Patent No.: US 7,052,133 B2
(45) Date of Patent: *May 30, 2006

(54) CONTACT LENSES

(75) Inventors: Joesph Michael Lindacher, Lawrenceville, GA (US); Jason Molinari, Atlanta, GA (US)

(73) Assignee: Novartis AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/848,791

(22) Filed: May 19, 2004

(65) Prior Publication Data

US 2004/0233382 A1    Nov. 25, 2004

Related U.S. Application Data

(60) Provisional application No. 60/472,365, filed on May 21, 2003.

(51) Int. Cl.
*G02C 7/04*    (2006.01)

(52) U.S. Cl. ............... 351/161; 351/160 R; 351/168; 351/169; 351/174; 351/177

(58) Field of Classification Search ............... 351/159, 351/160 R, 161, 168, 169, 174, 177, 178
See application file for complete search history.

(56) References Cited

U.S. PATENT DOCUMENTS

| | | | |
|---|---|---|---|
| 4,254,065 A | 3/1981 | Ratkowski | 264/2.5 |
| 4,310,225 A | 1/1982 | Davis | 351/176 |
| 4,418,991 A | 12/1983 | Bregger | 351/161 |
| 4,525,043 A | 6/1985 | Bronstein | 351/160 |
| 4,573,775 A | 3/1986 | Bayshore | 351/161 |
| 4,580,882 A | 4/1986 | Nuchman et al. | 351/161 |
| 4,614,413 A | 9/1986 | Obssuth | 351/161 |
| 4,618,227 A | 10/1986 | Bayshore | 351/161 |
| 4,618,229 A | 10/1986 | Jacobstein et al. | 351/161 |
| 4,702,573 A | 10/1987 | Morstad | 351/161 |
| 4,859,049 A | 8/1989 | Muller | 351/161 |
| 4,874,234 A | 10/1989 | Wichterle | 351/161 |
| 5,071,244 A | 12/1991 | Ross | 351/161 |
| 5,341,604 A | 8/1994 | Wood | 51/165.71 |
| 5,404,183 A | 4/1995 | Seidner | 351/161 |
| 5,493,350 A | 2/1996 | Seidner | 351/161 |
| 5,499,064 A | 3/1996 | Vansaghi | 351/158 |
| 5,526,071 A | 6/1996 | Seidner et al. | 351/161 |
| 5,532,768 A | 7/1996 | Onogi et al. | 351/160 |
| 5,619,289 A | 4/1997 | Seidner et al. | 351/161 |
| 5,635,998 A | 6/1997 | Baugh | 351/161 |
| 5,691,797 A | 11/1997 | Seidner et al. | 351/161 |
| 5,861,114 A | 1/1999 | Roffman et al. | 264/2.5 |
| 5,971,542 A | 10/1999 | Volker et al. | 351/161 |

(Continued)

FOREIGN PATENT DOCUMENTS

CA    1333757    1/1995

(Continued)

*Primary Examiner*—Scott J. Sugarman
*Assistant Examiner*—Darryl J. Collins
(74) *Attorney, Agent, or Firm*—Jian Zhou

(57) ABSTRACT

The present invention provides a contact lens having an orientation/stabilization and optionally translation feature that does not provide an prism optical distortion and can effectively maintain a predetermined orientation of the lens on an eye. Like a conventional lens ballast, the orientation feature of the invention works by weighing the lens at its lower half portion, causing it to come to an equilibrium position on the eye. With such orientation feature, the optical zone of the anterior surface can be designed independently to provide an optimal visual performance.

79 Claims, 9 Drawing Sheets

U.S. PATENT DOCUMENTS

| | | |
|---|---|---|
| 6,089,711 A | 7/2000 | Blankenbecler et al. .... 351/160 |
| 6,109,749 A | 8/2000 | Bernstein ................... 351/161 |
| 6,158,861 A | 12/2000 | Oyama et al. .............. 351/160 |
| 6,176,578 B1 | 1/2001 | Clutterbuck et al. ........ 351/160 |
| 6,183,082 B1 | 2/2001 | Clutterbuck ................ 351/160 |
| 6,206,520 B1 | 3/2001 | Jubin et al. ................. 351/160 |
| 6,270,218 B1 | 8/2001 | Clutterbuck ................ 351/160 |
| 6,364,483 B1 | 4/2002 | Grossinger et al. ......... 351/161 |
| 6,406,145 B1 | 6/2002 | Jubin ......................... 351/177 |
| 6,454,409 B1 | 9/2002 | Lorenz et al. .............. 351/160 |
| 6,457,826 B1 | 10/2002 | Lett ........................... 351/161 |
| 6,467,903 B1 | 10/2002 | Back .......................... 351/161 |
| 6,474,814 B1 | 11/2002 | Griffin ....................... 351/161 |
| 6,491,392 B1 | 12/2002 | Roffman et al. ............ 351/160 |
| 6,568,990 B1 | 5/2003 | Siders et al. ................. 451/5 |
| 6,595,639 B1 | 7/2003 | Ho et al. .................... 351/177 |
| 2002/0021410 A1 | 2/2002 | Ye et al. ..................... 351/161 |
| 2002/0024631 A1 | 2/2002 | Roffman et al. ............ 351/161 |
| 2002/0159025 A1 | 10/2002 | Legerton et al. ............ 351/160 |
| 2002/0186345 A1 | 12/2002 | Duppstadt ................... 351/161 |
| 2003/0016331 A1 | 1/2003 | Mandell ..................... 351/161 |
| 2003/0081171 A1 | 5/2003 | Griffin ....................... 351/161 |

FOREIGN PATENT DOCUMENTS

| | | |
|---|---|---|
| EP | 0 566 170 | 10/1993 |
| EP | 0 745 876 | 12/1996 |
| FR | 2 582 416 | 5/1985 |
| GB | 1 463 107 | 2/1977 |
| WO | WO 84/04401 | 11/1984 |
| WO | WO 94/23327 | 10/1994 |
| WO | WO 96/08745 | 3/1996 |
| WO | WO 98/45749 | 10/1998 |
| WO | WO 99/23527 | 5/1999 |
| WO | WO 00/48036 | 8/2000 |
| WO | WO 01/44860 | 6/2001 |
| WO | WO 01/75509 | 10/2001 |

CONTACT LENSES

This application claims the benefit under the benefit under 35 USC § 119 (e) of U.S. provisional application No. 60/472,365, filed May 21, 2003, incorporated by reference in its entirety.

This invention is related to contact lenses. In particular, the present invention is related to contact lenses, which require a rotational and/or orientation stability on an eye, such as toric contact lenses, biofocal or multifocal contact lenses, toric multifocal contact lenses, contact lenses capable of correcting high-order wavefront aberrations and the like.

BACKGROUND

Contact lenses are widely used for correcting many different types of vision deficiencies. These include defects such as near-sightedness and far-sightedness (myopia and hypermetropia, respectively), astigmatism, and defects in near range vision usually associated with aging (presbyopia).

Astigmatism occurs as the refractive error in an eye is dependent upon meridian. This is usually due to one or more refractive surfaces, most commonly the anterior cornea, having a toroidal shape. It may also be due to one or more surfaces being transversely displaced or tilted. Astigmatism is usually regular, which means that the principal (maximum and minimum power) meridians are perpendicular to each other. People with astigmatism have blurred vision at all distances, although this may be worse at distance or near, depending on the type of astigmatism. These people may complain of sore eyes and headaches associated with demanding visual tasks. Astigmatism can corrected with an astigmatic ophthalmic lens, which usually has one spherical surface and one toroidal (cylindrical) surface.

It is believed that presbyopia occurs as a person ages when the lens of eye loses its elasticity, eventually resulting in the eye losing the ability to focus at near distances (when distance vision is corrected), such as the normal reading distance, and in some cases at intermediate distances. Presbyopic persons (presbyopes) complain of difficulty performing close tasks. To compensate for presbyopia, ophthalmic lenses are required to be more positively powered or less negatively powered than the distance correction. Some presbyopic persons have both near vision and distance vision defects, requiring simultaneous or alternating vision lenses to properly correct their vision.

Simultaneous vision lenses refers to the class of bifocal or multifocal contact lenses in which optical power for distance vision and near vision are positioned simultaneously within the pupil area of a user's eye. They are generally composed of, within the pupil area of the eye, two or more concentric annular zones which alternately provide the distance and near power, or a multifocal zone having an aspheric surface which provides a continuous gradient of optical power over a selected range of powers. The visual performance of the simultaneous vision lens design is limited by its dependence on pupil size. Moreover, with all simultaneous vision lenses a partially degraded image of an object is projected onto the retina. The consequence of this image degradation is a reduction in visual actuity and/or contrast sensitivity (less signal, more noise), and the quality of the degraded image may or may not be acceptable to the patient. The clinical effects of this degradation may be measured objectively in terms of reduced visual acuity and contrast sensitivity. The subjective effects of the degradation are perceived by the patient in various ways which are collectively referred to as subjective blur. Therefore, when wearing a simultaneous vision lens, the patient may not be selecting between separate distance and near images. Rather, in the presence of subjective blur the patient may be attempting to function with the reduced level of spatial information content that is provided by a degraded image.

Alternating vision refers to the class of segmented (or translating) bifocal contact lenses in which the lens is divided into two optical zones. Typically the superior (or upper) zone is for distance vision correction, whereas the lower zone is for near vision correction. The distance portion (upper zone) subtends the pupil of the eye in primary gaze, while in downward gaze, the add power or near portion (lower zone) of the lens subtends the pupil. Effective use of an alternating vision lens requires vertical translation of the optical zones across the pupil when the eye changes from primary gaze to a downward gaze. In such a situation, the lens must move such that the pupil is predominately subtended by the distance zone for primary gaze and predominately subtended by the near zone for down-gaze. Unlike the simultaneous vision lenses, the visual performance of the alternating vision lenses is not significantly limited by its dependence on pupil size.

Moreover, large population of presbyopes also has an astigmatism vision error. Those presbyopes may require to wear contact lenses capable of correcting both astigmatism and presbyopia. Such contact lenses are disclosed in a co-pending U.S. patent application Ser. No. 60/400,254 filed Jul. 31, 2002 (incorporated herein by reference in its entirety) and have a cylindrical optical surface (or power) to correct astigmatism vision errors and a multifocal power to compensate for presbyopia.

Human eyes may suffer not only low-order monochromatic aberrations, such as defocus, astigmatism and prism, but also high-order monochromatic aberrations, such as a non-standard amount of spherical aberration, coma, and other irregular high-order aberrations. High order aberrations present in an eye can blur images formed on the retina, which can impair vision. The impact of these higher-order aberrations on retinal image quality can become significant in some cases, for example, in older eyes, in normal eyes with large pupils, and in the eyes of many people with irregular astigmatism, keratoconus, corneal dystrophies, post penetrating keratoplasty, scarring from ulcerative keratitis, corneal trauma with and without surgical repair, and sub-optimal outcome following refractive surgery. For those people, visual acuity of 20/20 or better can be achieved with customized contact lenses or contact lenses capable of correcting high-order monochromatic aberrations of the human eye. Unlike current contact lenses, customized contact lenses or contact lenses capable of correcting high order aberrations inevitably need to have a complex surface design without restrictions of rotational symmetry.

Effective use of each of the above described contact lenses and the like requires a rotational and/or orientational stability on an eye. One of the most commonly utilized basic techniques, which can maintain a predetermined orientation of a contact lens on an eye, is prism stabilization. By using this technique, a contact lens is provided with prism ballast, which is generally a base-down prism to increases the mass of the lower portion of the lens and to create a weighting effect to orient the lens. However, there are some disadvantages associated with designs of contact lenses having prism ballast in the prior art. Those lenses are not comfortable to wear and/or not highly effective in maintaining lens orientation. Furthermore, contact lenses with prism ballast as orientation feature may not be able to provide better visual performance since they tend to have optical distortions known as prism.

There are other orientation/stabilization features which have been used or proposed to be used in contact lenses. Exemplary orientation/stabilization features include a faceted surface in which parts of the lens geometry is removed to control the lens orientation and double slab-off features which have a top slab-off zone and a bottom slab-off zone zones to maintain the lens orientation on the eye as well as a visual cue on the lenses so that a wearer can insert the lenses in the proper orientation. The lenses with these orientation/stabilization features are not comfortable to wear and/or not highly effective in maintaining lens orientation.

Therefore, there is a need for a contact lens with an orientation feature, wherein the lens is substantially free of prism optical effects and is comfortable to wear.

An object of the invention is to provide a contact lens having an orientation feature which can maintain effectively the lens in a desired rotational and orientation on an eye, wherein the lens is substantially free of prism optical effects and is comfortable to wear.

Another object of the invention is to provide a method for producing a contact lens having an orientation feature which can maintain a predetermined orientation on an eye, wherein the lens is substantially free of prism optical effects and is comfortable to wear.

SUMMARY OF THE INVENTION

In accomplishing the foregoing, there is provided, in accordance with one aspect of the present invention, a contact lens having an orientation/stabilization feature that does not provide an prism optical distortion and can maintain the lens in a predetermined orientation on an eye. A contact lens of the invention comprises an anterior surface and an opposite posterior surface. The anterior surface includes: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone. The anterior surface has a mirror symmetry with respect to a vertical meridian plane and is continuous at least in first derivative. The contact lens is weighed at its lower half portion by varying lens thickness within the peripheral zone and second blending zone to cause it to come to an equilibrium position on the eye and has a lens thickness profile characterized by that the lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the peripheral zone along each semi-meridian until reaching a lens thickness maximum and then decreases. In alternative preferred embodiments, the lens thickness profile is further charaterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%, preferably by less than 30%, more preferably less than 15%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

The invention, in another aspect, provides a method for producing a contact lens having an orientation/stabilization feature of the invention as described above. The method comprises the steps of designing the anterior surface and the posterior surface of the contact lens, wherein anterior surface includes: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone. The anterior surface has a mirror symmetry with respect to a vertical meridian plane and is continuous at least in first derivative. The contact lens is weighed at its lower half portion by varying lens thickness within the peripheral zone and second blending zone to cause it to come to an equilibrium position on the eye and has a lens thickness profile characterized by that the lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the peripheral zone along each semi-meridian until reaching a lens thickness maximum and then decreases. The central optical zone is designed independently from the peripheral zone and then blended with the peripheral zone by using the first blending zone.

The invention, in a further aspect, provides a series of contact lenses capable of correcting different vision deficiencies, wherein each contact lens in the series comprises an anterior surface and a posterior surface, wherein the posterior surface of each lens in the series is substantially identical to each other, wherein the anterior surface of each lens in the series include: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone, wherein the peripheral zone, the second blending zone and the edge zone of each lens in the series is identical to each other whereas the central optical zone and the first blending zone of each lens in the series are different from each other. The anterior surface of each lens has a mirror symmetry with respect to a vertical meridian plane and is continuous at least in first derivative. Each lens is weighed at its lower half portion by varying lens thickness within the peripheral zone and second blending zone to cause it to come to an equilibrium position on the eye and has a lens thickness profile characterized by that lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the peripheral zone along each semi-meridian until reaching a lens thickness maximum and then decreases.

The invention, in another further aspect, provides a method for producing a series of contact lenses which each correct different vision difficiencies. The method comprises the steps of: designing the anterior surface and the posterior surface of the contact lens, wherein the posterior surface of each lens in the series is substantially identical to each other, wherein the anterior surface of each lens in the series include: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone, wherein the peripheral zone, the second blending zone and the edge zone of each lens in the series is identical to each other whereas the central optical zone and the first blending zone of each lens in the series are different from each other. The anterior surface of each lens has a mirror symmetry with respect to a vertical meridian plane and is continuous at least in first derivative. Each lens is weighed at its lower half portion by varying lens thickness within the peripheral zone and second blending zone to cause it to come to an equilibrium position on the eye and has a lens thickness profile characterized by that lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the peripheral zone along each semi-meridian until reaching a lens thickness maximum and then decreases. The central optical zone is designed independently from the peripheral zone and then blended with the peripheral zone by using the first blending zone.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Figure 1A:
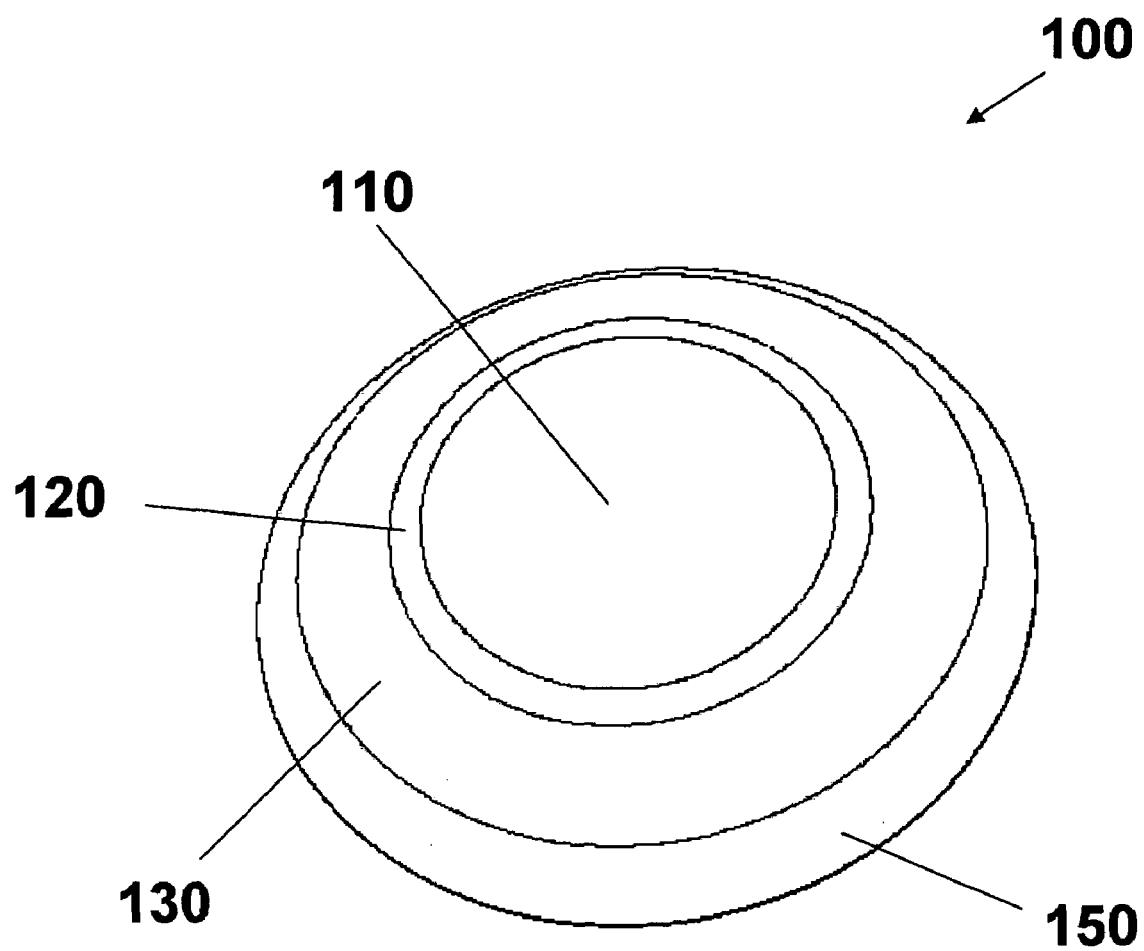
FIG. 1A is an oblique view of a contact lens according to a preferred embodiment of the invention.
Figure 1B:
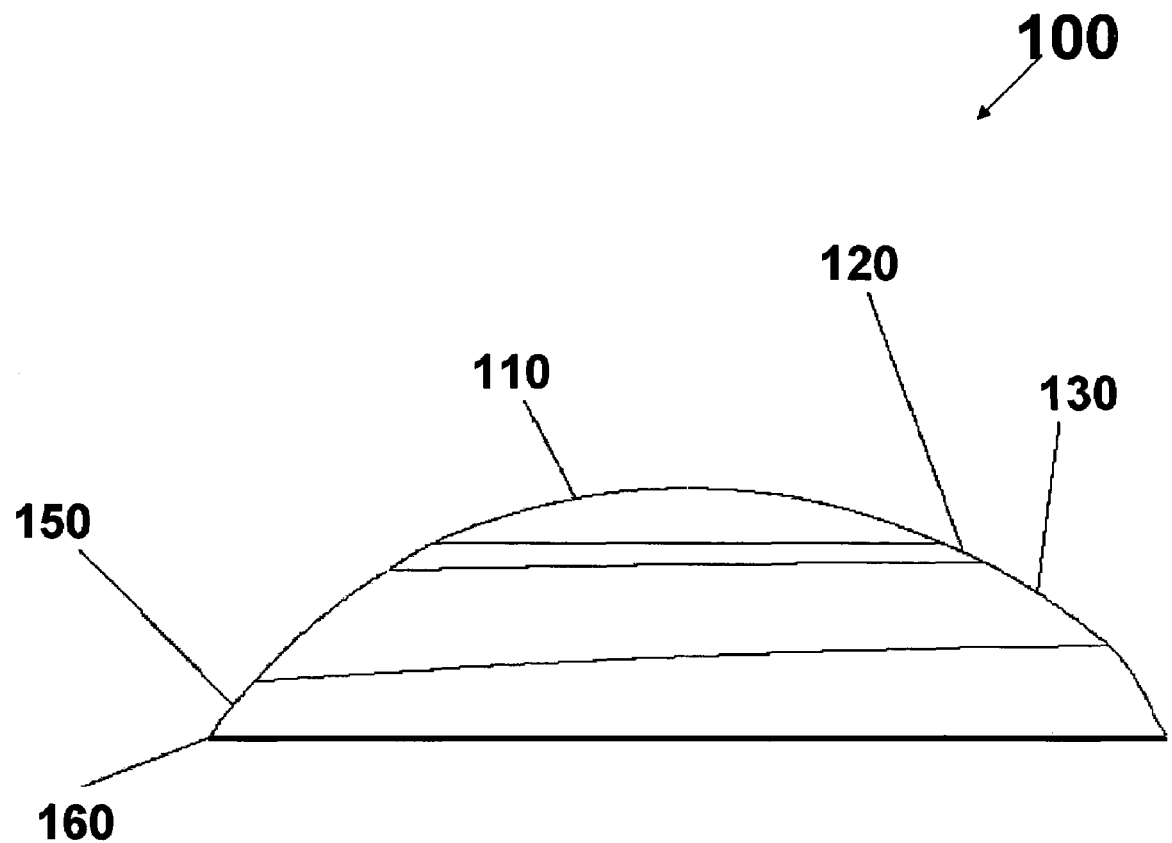
FIG. 1B is a side view of a contact lens Shown in FIG. 1A.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

The present invention is generally related to contact lenses which require a rotational and/or orientation stability on an eye. In particular, the present invention is related to contact lenses having an orientation/stabilization feature which can maintain a predetermined orientation on an eye, wherein the lens is substantially free of prism optical effects and is comfortable to wear.

In one aspect, the present invention provide a contact lens which comprises an anterior surface and an opposite posterior surface, wherein the anterior surface includes: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone. The anterior surface has a mirror symmetry with respect to a vertical meridian plane and is continuous at least in first derivative. The contact lens is weighed at its lower half portion by varying lens thickness within the peripheral zone and second blending zone to cause it to come to an equilibrium position on the eye and has a lens thickness profile characterized by that lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the peripheral zone along each semi-meridian until reaching a lens thickness maximum and then decreases.

In a preferred embodiment, the lens thickness profile is further charaterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%, preferably by less than 30%, more preferably less than 15%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

A "vertical meridian", in reference to the anterior surface of a contact lens, refers to an imaginary line running vertically from the top, through the geometric center, to the bottom on the anterior surface, when said lens is maintained at a predetermined orientation on an eye. A "horizontal meridian", in reference to the anterior surface of a contact lens, refers to an imaginary line running horizontally from the left side, through the center, to the right side on the anterior surface, when said lens is maintained at a predetermined orientation on an eye. The horizontal and vertical meridians are perpendicular to each other.

A "outer boundary", in reference to a zone other than a central optical zone on the anterior surface of a contact lens, refers to one of two peripheral boundaries of that zone which is further away from the geometric center of the anterior surface.

An "inner boundary", in reference to a zone other than a central optical zone on the anterior surface of a contact lens, refers to one of two peripheral boundaries of that zone which is closer to the geometric center of the anterior surface.

A "semi-meridian" refers to an imaginary line running radially from the geometric center of the anterior surface of a contact lens to the edge of the contact lens.

The "upper portion of the vertical meridian" refers to one half vertical meridian that is above the geometric center of the anterior surface of a contact lens, when said lens is maintained at a predetermined orientation on an eye.

The "lower portion of the vertical meridian" refers to one half vertical meridian that is below the geometric center of the anterior surface of a contact lens, when said lens is maintained at a predetermined orientation on an eye.

A "continuous transition", in reference to two or more zones, means that these zones are continuous at least in first derivative, preferably in second derivative.

A "vertical meridian plane" refers to a plane that cuts through the optical axis of a contact lens and a vertical meridian on the anterior surface of the contact lens.

A "sector", in reference to the anterior surface of a contact lens, means an area bounded by two sector-bounding semi-meridians at an equal angle relative to the lower portion of the vertical meridian and by a portion of the edge included between the two sector-bounding semi-meridians. The edge included between the two sector-bounding semi-meridians is the sum of a first portion of the edge between one of the two semi-meridians and the lower porion of the vertical meridian and a second portion of the edge between the other semi-meridian and the lower porion of the vertical meridian.

Two "sector-bounding semi-meridians" refer to two semi-meridians which divides the anterior surface into two sectors. "Lens thickness" refers to a shortest distance from a point on the anterior surface to the posterior surface of a contact lens.

A "percentage of difference between two values of lens thickness" is obtained by first subtracting the smaller value from the larger value and then dividing the subtracting result with the larger value and finally multiplying it with 100.

The central optical zone of a contact lens can have any shape suitable for a contact lens design, for example, such as circular, oval, or the like. Preferably, the central optical zone is circular. More preferably, the central optical zone is a circular zone which is concentric with the geometric center of the anterior surface, though the center of the central optical zone can deviate from the geometric center of the anterior or posterior surface by up to 2 mm. Where the central optical zone is concentric with the geometric center of the anterior or posterior surface, the vertical and horizontal meridians each pass through the center of the central optical zone. Where the center of the central optical zone deviates from the geometric center of the anterior or posterior surface, the center of the optical zone is on the vertical meridian and less than about 1.0 mm from the geometric center of the anterior surface.

A "blending zone" refers to a non-optical zone located between two zones and providing a continuous transition between these two zones.

The presence of a first blending zone can allow to separately and independently design the central optical zone and the peripheral zone, so as to ensure a continuous transition from the central optical zone to the peripheral zone. With a first blending zone between the central optical zone and the peripheral zone, a contact lens can be produced to have flexion points and/or sharp boundaries at the junction between two zones being eliminated and thereby provide improved wearer's comfort. In addition, the first blending zone between the central optical zone and the peripheral zone can de-couple the optical features and the mechanical stabilization and translation features of the lens, thus preventing the introduction of prism into the optics. The first blending zone has a surface that ensures that the peripheral zone, the first blending zone and the central optical zone are tangent to each other. The blending zone of the invention can be any surface described by a mathematical function, preferably a spline-based mathematical function, or made of different tangent surface patches.

"Tangent surface patches" refer to combinations of surfaces with curvatures that are continuous in first derivative, preferably in second derivative, from each other.

The peripheral zone can be composed of one or more peripheral bands or regions which are patched together to form a continuous surface. It is discovered that, when a contact lens has in the peripheral zone and the second blending zone a lens thickness profile as described above, such contact lens can be maintained effectively at a predetermined orientation on an eye. Like a conventional lens ballast, the orientation feature of the invention works by weighing the lens at its lower half portion, causing it to come to an equilibrium position on the eye. With such orientation feature, the optical zone of the anterior surface can be designed independently to provide an optimal visual performance.

In another preferred embodiment, lens thickness has value ranging between about 110 to about 150 micrometers in the central 90% of the peripheral zone along the upper portion of the vertical meridian. Actual values will depend on material properties and base curve (posterior surface) parameters.

In another preferred embodiment, lens thickness at the intersection point of the lower portion of the vertical meridian with the inner boundary of the central 90% of the peripheral zone is from about 200 micrometers to about 280 micrometers; lens thickness at the intersection point of the lower portion of the vertical meridian with the outer boundary of the central 90% of the peripheral zone is from about 320 micrometers to about 400 micrometers. Actual values will depend on material properties and base curve (posterior surface) parameters.

The size of the sector can be varied. The sector is bound by two sector-bounding semi-meridians preferably at about 90 degrees, more preferably at about 120 degree, even more preferably about 135 degree, relative to the lower portion of the vertical meridian and the edge included between the two sector-bounding semi-meridians. In those preferred embodiments, lens thickness maximums along the horizontal meridian are preferably from about 200 micrometers to about 300 micrometer. Where the sector is bound by two sector-bounding semi-meridians preferably at about 120 degree relative to the lower portion of the vertical meridian and the edge included between the two sector-bounding semi-meridians, lens thickness, in this sector, increases gradually along each semi-meridian until reaching a lens thickness maximum and then decreases whereas in the other remaining sector lens thickness remains substantially constant or increases gradually, along each semi-meridian within this remaining sector, from the outer boundary of the peripheral zone to the inner boundary of the peripheral zone in a manner that the difference between the values of lens thickness at two intersection points of any semi-meridian with the outer and inner boundaries of the peripheral zone is less than 15%.

In another preferred embodiment, lens thickness maximums along semi-meridians are located slightly inside of, alone or slightly outside of the outer boundary of the peripheral zone within the sector. More preferably, lens thickness maximums along semi-meridians are located slightly outside (less than 0.4 mm) of the outer boundary the peripheral zone within the sector.

In another preferred embodiment, distances between the edge of the lens and any points along the outer boundary of the peripheral zone within the sector are from about 0.6 mm to about 2.0 mm.

In another preferred embodiment, the entire peripheral zone of a contact lens of the invention has a continuity in first derivative and/or in second derivative. Such peripheral zone can be a continuous surface defined by one or more mathematical functions, preferably by a spline-based mathematical function, or is made of several different surface patches.

Where a contact lens is a translating multifocal lens or the like that requires vertical translation of the optical zones across the pupil when the eye changes from primary gaze to a downward gaze, it is preferably that the peripheral zone comprises a ridge feature disposed below the central optical zone and extending outwardly from the peripheral zone (the anterior surface) to enable engagement with a lower eyelid of a user and thereby provide vertical translation support for the contact lens when being worn by the user. More preferably, the peripheral zone comprises a ramped ridge zone as disclosed in a copending U.S. patent application Ser. No. 60/398,485 filed on Jul. 24, 2002, entitled "Translating Contact Lens Having A Ramped Ridge", herein incorporated by reference in its entirety. The ramped ridge zone is disposed below the optical zone and includes a upper boundary, a lower ramped boundary, a latitudinal ridge that extends outwardly from the anterior surface, and a ramp that extends downwardly from the lower ramped boundary and has a curvature or slope that provides a varying degree of interaction between the ramped ridge zone and the lower eyelid depending on where the lower eyelid strikes the ramped ridge zone. The lower eyelid of the eye is engaged with at least some portion of the ramped ridge zone at all times. Such ramped ridge zone can provide wearers comfort and also is capable of controlling contact lens position on an eye in primary gaze and/or translating amount across the eye when the eye changes from gazing at an object at a distance to gazing at an object at an intermediate distance or at a nearby object.

One advantage of incorporating a ramp in the ramped ridge zone is that it can provide a smooth transition zone for the eyelid to "ramp up" the ridge. This gradual engagement will benefit the wearer by increasing comfort and reducing lens sensation in the eye because the ridge will always be engaged.

Another advantage of incorporating a ramp in the ramped ridge zone is that, since the ramp slope can determine lens position on an eye in primary gaze (horizontal), a lens design for a desired visual performance can be reliably implemented in the production of translating contact lenses. For example, a ramp is composed of a simple spherical curvature. The slope of a ramp depends on the radius of the curvature. Where a curvature has a large radius, the ramp is longer and steep. Where a curvature has a small radius, the ramp is shorter and flat. For a bifocal translating contact lens, the curvature of a ramp can have a radius of between 0.1 to 2.0 mm to provide a desired lens position on the eye in the primary gaze.

As will be readily appreciated by those of skill in the art, many different types of ramped ridge zones are possible with the present invention. Exemplary preferred ramped ridge zones include without limitation to: a ramped ridge zone having a flattened lower ramp edge and a flattened latitudinal ridge; and a ramped ridge zone having two bumps formed at the two end of the latitudinal ridge the elevation height of which are higher at the both ends than in the middle. The above ramped ridge zones may accommodate better to the lower eyelid of the eye, and may distribute more uniformly translating stress over the entire lens-interacting portion of the lower eyelid.

In a preferred embodiment, the entire peripheral zone including ridge features or ramped ridge features of a contact lens of the invention has a continuity in first derivative and/or in second derivative. Such peripheral zone can be a continuous surface defined by one or more mathematical functions, preferably by a spline-based mathematical function, or is made of several different surface patches.

The maximum lens thickness of a ridge or ramped ridge is preferably from about 400 micrometers to about 600 micrometers. Actual values will depend on material properties and base curve (posterior surface) parameters.

The second blending zone is designed to ensure a continuous transition from the peripheral zone to the edge zone and to weigh, in combination with the peripheral zone, the lens at its lower half portion, causing it to come to an equilibrium position on the eye. With a second blending zone between the peripheral zone and the edge zone, a contact lens can be produced to have flexion points and/or sharp boundaries at the junction between two zones being eliminated and thereby provide improved wearer's comfort. The second blending zone can be any surface described by a mathematical function, preferably a spline-based mathematical function, or made of different tangent surface patches.

The anterior surface of a contact lens comprises an edge zone which is adjacent to the second blending zone. The edge zone, in combination with the posterior surface, provides a substantially uniform thickness which may provide comfortable lens fit on an eye. Preferably, the edge zone is circular.

Contact lenses of the invention can be either hard or soft lenses. Soft contact lenses of the invention are preferably made from a soft contact lens material, such as a silicon or fluorine-containing hydro-gel or HEMA. It will be understood that any lens material can be used in the production of a contact lens of the invention.

A contact lens of the invention can be a toric, multifocal, toric multifocal contact lens, customized contact lenses, or the like.

A "customized contact lens", as used herein, means: (1) a contact lens that is designed using input of wavefront aberration measurements of an eye of an individual and be able to correct higher-order wavefront aberrations; and/or (2) a contact lens that has a posterior surface accommodating the corneal topography of an eye of an individual or a corneal topography statistically represent a segment of population.

The wavefront aberrations of an eye of an individual can be determined by any suitable methods known to one skilled in the art, including without limitation, Shack-Hartmann techniques, Tscheming techniques, retinal raytracing techniques, and spatially-resolved refractometer techniques. For example, Liang et al. in J. Optical Soc. Am. 11:1–9, the entirety of which are herein incorporated by reference, teach how to determine wavefront aberrations of an eye at various pupil diameters using a Hartmann-Shack system. The wavefront aberrations generally are quantified in Zernike polynomials which are a set of functions that are orthogonal over the unit circle. Since Zernike polynomials are orthogonal, the aberrations are separable and can be treated as such. The first order Zernike modes are the linear terms. The second order Zemike modes are the quadratic terms, which correspond to the aberrations such as defocus and astigmatism. The third order Zernike modes are the cubic terms, which correspond to the coma and coma-like aberrations. The fourth order Zemike modes contain spherical aberrations as well as other modes. The fifth Zemike modes are the higher-order, irregular aberrations. Local irregularities in the wavefront within the pupil are represented by these higher-order Zernike modes.

"High-order" aberrations of an eye as used herein refers to monochromatic aberrations beyond defocus and astigmatism, namely, third order, fourth order, fifth order, and higher order wavefront aberrations.

A contact lens, which has a posterior surface capable of accommodating the corneal topography of an eye or a corneal topography statistically represent a segment of population, will provide a good or adequate fit to the cornea of that eye and therefore enhance the wearer's comfort. It is believed that the posterior surface of a contact lens does not need to match perfectly the corneal topography of an eye. A perfect match means the posterior surface of a contact lens is exactly superimposable on a corneal topography. A contact lens, which has a posterior surface perfectly matching the corneal topography of an eye, may have inadequate on-eye movement of the lens and may have an adverse impact on wearer's comfort.

Corneal topographic data can be acquired using a corneal topographer or videokeratoscope. Corneal topography data may be in any forms suitable for use in designing an ophthalmic lens. Exemplary forms include, but are not limited to, Zernike polynomials, point cloud data and the like. Preferably, corneal topography data is in a form in which the wavefront aberrations of an eye are quantified.

Based on aberration measurements of an eye of an individual, the central optical zone on the anterior surface of a customized contact lens is designed in various ways not only to correct low order aberrations (defocus, astigmatism, and prism) but also to correct one or more high order aberrations.

A customized contact lens of the invention can be designed and produced preferably by using methods described in a published PCT patent application No. WO 02/088830, herein incorporated by reference in its entirety.

As will be readily appreciated by those of skill in the art, many different types of optical zones on either or both of the anterior surface and posterior surface are possible with the present invention. Preferably, these different types of optical zones are on the anterior surface.

In a preferred embodiment, at least one of the optical zones of the anterior and posterior surfaces of a contact lens of the invention includes a first portion to provide distance vision correction for the eye and a second portion disposed beneath the first portion to provide near vision correction for the eye. In particular, the anterior surface of a contact lens includes a central optical zone having at least a first optical zone for primary gaze, a second optical zone for down-gaze and an optical blending zone between the first and second optical zones, wherein the optical blending zone has a surface that ensures a smooth surface transition from the first optical zone to the second optical zone and that allows the first and second optical zone to be designed independently and optimally so that ghost images or blur from the transition between the first and second optical zones can be minimized or eliminated. Such a preferred lens is disclosed in a copending U.S. patent application Ser. No. 60/446,658 filed Feb. 11, 2003, entitled "OPHTHALMIC LENS HAVING AN OPTICAL ZONE BLEND DESIGN", which is incorporated by reference in its entirety.

The first optical zone is located in the upper portion of the central optical zone. "The first optical zone being located in the upper portion of the central optical zone" means that at least 60%, preferably, preferably at least 80%, more preferably at least 90%, of the first optical zone is located in the half central optical zone above the horizontal meridian. It is understood that the distance vision zone can be larger than or smaller than or equal to the half central optical zone above the horizontal meridian.

Preferably, the lower boundary line with the optical blending zone of the first optical zone is at or below a horizontal line passing through the center of the central optical zone (the horizontal meridian or line parallel with the horizontal meridian) at least in its central portion (i.e., around the intersection point of the lower boundary line with the vertical meridian or with a line parallel to the vertical meridian and passing through the center of the central optical zone). More preferably, the lower boundary line with the optical blending zone of the first optical zone is below a horizontal line passing through the center of the central optical zone.

The apex of first optical zone 12 preferably coincides with the center of the central optical zone. The optical axis of the lens passes through the apex of the first optical zone and the center of the optical zone of the posterior surface (base curve). The first optical zone can be defined by any mathematical function, for example, a spherical function, a conic function, a biconic function, Zernike polynomials, a spline-based mathematical function or combinations thereof.

The second optical zone typically is a near distance optical zone for down-gaze (for reading). The second optical zone is located below the optical blending zone 16. The vertex center of the second optical zone is preferably located at the intersection of the vertical meridian with the boundary line of the second optical zone with the optical blending zone. The intersection point is preferably on the order of 1 mm, below the apex (center point) of the first optical zone, though other separation distances are possible. The second optical zone can be defined by any mathematical function, for example, a spherical function, a conic function, a biconic function, Zernike polynomials, a spline-based mathematical function or combinations thereof.

For a segmented bifocal contact lens, the images from both the first and second optical zones on eye, must be laterally coincident to minimize or eliminate ghost images. Ghost images are caused when the images from multiple optical zones on eye have lateral separation. The images from both zones will have an axial separation, on eye, typical of a bifocal lens. As embodied herein, the line passing through the vertex center of the second optical zone and the center of curvature at the vertex center of the second optical zone preferably intersects the line passing through the apex of the first optical zone and the center of curvature at the apex of the posterior surface, wherein the intersection point is within 2 mm of the center of curvature at the apex of the base optical surface. Such optical zone may properly align the lateral images near the optical axis of the lens and controls image jump to the wearer.

In a more preferred embodiment, the optimal alignment of the second optical zone is controlled by rotating the second optical zone around the apex of the second optical zone. To properly align the lateral images, the line passing through the vertex center of the second optical zone and the center of curvature at the vertex center of the second optical zone should pass through the center of curvature of the (posterior) base curve surface. However, in the preferred embodiment, the asymmetrical stabilization and translation features of the lens require that the line passing through the vertex center of the second optical zone and the center of curvature at the vertex center of the second optical zone intersects the central axis of the posterior (or base curve) surface slightly displaced of the center of curvature.

In another preferred embodiment, at least one of the optical zones of the anterior and posterior surfaces of a contact lens of the invention has a toric optics feature to correct for a wearer's astigmatism.

In another preferred embodiment, one of the optical zones of the anterior and posterior surfaces of a contact lens of the invention comprises a toric optics feature and the other optical zone comprises a multifocal optics feature, wherein both the optical zones combine together to provide a cylindrical optical power to correct astigmatism vision errors and a multifocal power to compensate for presbyopia. The multifocal optics feature can be multiple concentric annular zones or a progressive power zone or the like. Preferably, the multifocal optics feature is a progressive power zone which is substantially concentric with the central axis. The progressive power zone has a diameter of preferably about 1.0 mm to about 3.0 mm, more preferably about 1.5 mm to 2.2 mm. The toric optics feature can be on the anterior surface and the multifocal optics feature can be on the posterior surface or vice versa. Preferably, the toric optics feature is on the anterior surface and the multifocal optics feature is on the posterior surface. The toric optics feature can have the shape of the toric optics of any conventional toric lens. Preferably, the toric optics feature is circular. More preferably, circular toric optics feature is substantially concentric with the central axis.

In another preferred embodiment, one of the optical zones of the anterior and posterior surfaces of a contact lens of the invention comprises a toric optics feature and a multifocal optics feature therewithin, wherein the two optical zones combine together to provide a cylindrical optical power to correct astigmatism vision errors and a multifocal power to compensate for presbyopia. Both the toric and multifocal optics features can be either on the anterior surface or on the posterior surface. Preferably, both the toric and multifocal optics features are on the anterior surface.

In another preferred embodiment, at least one of the optical zones of the anterior and posterior surfaces of a contact lens of the invention provides a vertically oriented coma-like wavefront aberration. Such lens is capable of correcting presbyopia or of preventing children's eyes from becoming severely myopic and is described in a copending patent application Ser. No. 60/443,400 filed Jan. 29, 2003, entitled "Ophthalmic Lenses", which is incorporated by reference in its entirety.

A "coma-like wavefront aberration" refers to a wavefront aberration which is, or is an equivalent of, a wavefront aberration described by any one of third order, fifth order, seventh order Zernike coma-like terms, and combinations thereof in the proposed OSA Standard (Optical Society of America) Zernike Polynomials.

A table of the proposed OSA Standard (Optical Society of America) Zernike Polynomials up to $7^{th}$ order is displayed below (More information on Zernike polynomials is available on http://color.eri.harvard.edu/standardization/standards TOPS4.pdf).

Table of Zernike Polynominals in Polar Coordinates up to $7^{th}$ order (36 terms)

| j | n | m | $Z_n^m (\rho, \theta)$ |
|---|---|---|---|
| 0 | 0 | 0 | 1 |
| 1 | 1 | -1 | $2 \rho \sin \theta$ |
| 2 | 1 | 1 | $2 \rho \cos \theta$ |
| 3 | 2 | -2 | $\sqrt{6} \rho^2 \sin 2\theta$ |
| 4 | 2 | 0 | $\sqrt{3} (2\rho^2 - 1)$ |
| 5 | 2 | 2 | $\sqrt{6} \rho^2 \cos 2\theta$ |
| 6 | 3 | -3 | $\sqrt{8} \rho^3 \sin 3\theta$ |
| 7 | 3 | -1 | $\sqrt{8} (3\rho^3 - 2\rho) \sin \theta$ |
| 8 | 3 | 1 | $\sqrt{3} (3\rho^3 - 2\rho) \cos \theta$ |
| 9 | 3 | 3 | $\sqrt{8} \rho^3 \cos 3\theta$ |
| 10 | 4 | -4 | $\sqrt{10} \rho^4 \sin 4\theta$ |
| 11 | 4 | -2 | $\sqrt{10} (4\rho^4 - 3\rho^2) \sin 2\theta$ |
| 12 | 4 | 0 | $\sqrt{5} (6\rho^4 - 6\rho^2 + 1)$ |
| 13 | 4 | 2 | $\sqrt{10} (4\rho^4 - 2\rho^2) \cos 2\theta$ |
| 14 | 4 | 4 | $\sqrt{10} \rho^4 \cos 4\theta$ |
| 15 | 5 | -5 | $\sqrt{12} \rho^5 \sin 5\theta$ |
| 16 | 5 | -3 | $\sqrt{12} (5\rho^5 - 4\rho^3) \sin 3\theta$ |
| 17 | 5 | -1 | $\sqrt{12} (10\rho^5 - 12\rho^3 + 3\rho) \sin \theta$ |
| 18 | 5 | 1 | $\sqrt{12} (1\rho^5 - 12\rho^3 + 3\rho) \cos \theta$ |
| 19 | 5 | 3 | $\sqrt{12} (5\rho^5 - 4\rho^3) \cos 3\theta$ |
| 20 | 5 | 5 | $\sqrt{12} \rho^5 \cos 5\theta$ |
| 21 | 6 | -6 | $\sqrt{14} \rho^6 \sin 6\theta$ |
| 22 | 6 | -4 | $\sqrt{14} (6\rho^6 - 5\rho^4) \sin 4\theta$ |
| 23 | 6 | -2 | $\sqrt{14} (15\rho^6 - 20\rho^4 + 6\rho^2) \sin 2\theta$ |
| 24 | 6 | 0 | $\sqrt{7} (20\rho^6 - 30\rho^4 + 12\rho^2 - 1)$ |
| 25 | 6 | 2 | $\sqrt{14} (15\rho^6 - 20\rho^4 + 6\rho^2) \cos 2\theta$ |
| 26 | 6 | 4 | $\sqrt{14} (6\rho^6 - 5\rho^4) \cos 4\theta$ |
| 27 | 6 | 6 | $\sqrt{14} \rho^6 \cos 6\theta$ |
| 28 | 7 | -7 | $4 \rho^7 \sin 7\theta$ |
| 29 | 7 | -5 | $4 (7\rho^7 - 6\rho^5) \sin 5\theta$ |
| 30 | 7 | -3 | $4 (21\rho^7 - 30\rho^5 + 10\rho^3) \sin 3\theta$ |
| 31 | 7 | -1 | $4 (35\rho^7 - 60\rho^5 + 30\rho^4 - 4\rho) \sin \theta$ |
| 32 | 7 | 1 | $4 (35\rho^7 - 60\rho^5 + 30\rho^4 - 4\rho) \cos \theta$ |
| 33 | 7 | 3 | $4 (21\rho^7 - 30\rho^5 + 10\rho^3 ) \cos 3\theta$ |
| 34 | 7 | 5 | $4 (7\rho^7 - 6\rho^5) \cos 5\theta$ |
| 35 | 7 | 7 | $4 \rho^7 \cos 7\theta$ |

A vertically oriented coma-like aberration is wavefront aberration which is, or is an equivalent of, a wavefront aberration described by at least one of the third order coma-like Zernike term Z7, the fifth order coma-like Zernike term Z17, the seventh order coma-like term Z31 and combinations thereof.

In another preferred embodiment, the optical zone on the anterior surface of a customized contact lens of the invention produce, alone or in combination with the optics of an eye, a vertically oriented coma-like wavefront aberration, as disclosed in a copending patent application Ser. No. 60/443,400 filed Jan. 29, 2003, entitled "Ophthalmic Lenses", which is incorporated by reference in its entirety. Such lens is capable of correcting presbyopia or of preventing children's eyes from becoming severely myopic.

In another preferred embodiment, the central optical zone on the anterior surface of a contact lens of the invention includes a distance vision zone and a rotationally-asymmetrical progressive zone adjacent to the distance vision zone, wherein the distance vision zone is located in the upper portion of the central optical zone and provides a distance power for distance vision correction, wherein the rotationally-asymmetrical progressive zone is located in the lower portion of the central optical zone and provides a variable intermediate vision correction and near vision correction, wherein the rotationally-asymmetrical progressive zone has an upper boundary, a lower boundary, a radial center, an upper vertically radiating semi-meridian and a lower vertically radiating semi-meridian, and wherein the rotationally-asymmetrical progressive zone further has a surface that provides a power profile that increases, along the upper vertically radiating semi-meridian, from the distance power at the upper boundary to a near power at the radial center and remains substantially constant from the radial center to a point near the lower boundary along the lower vertically radiating semi-meridian. Such optical zone is described in detail in a copending U.S. patent application Ser. No. 60/463,210 filed April 16, 2003, entitled "MULTI-FOCAL OPHTHALMIC LENS", which is incorporated by reference in its entirety.

It is understood that the optical power profile of the lens along the upper vertically radiating semi-meridian can be defined by a plurality of (at least two) linear equations (1), $$\begin{cases} p(x) = b_1 + k_1 x & 0 \leq x < x_1 \\ p(x) = b_2 + k_2 x & x_1 \leq x < x_2 \\ \vdots \\ p(x) = b_i + k_i x & x_{i-1} \leq x < x_i \\ \vdots \end{cases} \quad (1)$$

in which p(x) is an added power at a radial distance of x from the radial center; bi is a coefficient which is the intercept of a linear line; and ki is the rate of change of the added power as function of the distance from the radial center. b1 can be considered as the added maximum power and can have a value from about 3 to 10, preferably a value of about 5. Each function defins an added power within a specific range, for example, between xi-1 and xi within the progressive zone. In a preferred embodiment, the added power profile is defined by two or more linear functions.

Alternatively, the optical power profile of the lens along the upper vertically radiating semi-meridian can be defined by equation (2) or equation (3), $$p(x) = \frac{A}{2} \cdot \cos\left(\frac{x}{X_o}\pi\right) + \frac{A}{2} \quad (2)$$

$$p(x) = A \cdot \left[1 - \left(\frac{x}{X_o}\right)^n\right] \quad (3)$$

in which p(x) is an added power at a radial distance of x from the radial center; A is the maximum added power; $X_o$ is the distance between the radial center and the optical axis of the lens; and n is any number which can be an integer or non-integer larger than 1 but smaller than or equal to 10. Preferably, n is larger than or equal to 3 but smaller than or equal to 5.

A "top boundary", in reference to the central optical zone of a contact lens, refers to a portion of the peripheral boundary of the central optical zone, which is above the horizontal meridian and around the intersection of the vertical meridian with the peripheral boundary.

A "bottom boundary", in reference to the central optical zone of a contact lens, refers to a portion of the peripheral boundary of the central optical zone, which is below the horizontal meridian and around the intersection of the vertical meridian with the peripheral boundary.

A "variable intermediate vision correction", in reference to an optical zone of a contact lens, refers that the optical zone can provide different optical powers at different positions within the optical zone and thereby correct visions at different intermediate distances.

A "radial center", in reference to a rotationally asymmetrical progressive zone of a contact lens, refers to a first surface point at which the optical power of the lens turns into the near optical power when tracing from top to bottom along the vertical meridian.

A "radiating semi-meridian", in reference to a rotationally asymmetrical progressive zone of a contact lens, refers to an imaginary line running radially from the radial center of the rotationally asymmetrical progressive zone to the peripheral boundary of the rotationally asymmetrical progressive zone on the anterior surface of a contact lens.

An "upper vertically radiating semi-meridian" refers to an imaginary line running upwardly and vertically from the radial center of a rotationally asymmetrical progressive zone to the upper boundary of the rotationally asymmetrical progressive zone on the anterior surface of a contact lens, when said lens is maintained at a predetermined orientation on or in an eye.

A "lower vertically radiating semi-meridian" refers to an imaginary line running downwardly and vertically from the radial center of a rotationally asymmetrical progressive zone to the lower boundary of the rotationally asymmetrical progressive zone on the anterior surface of a contact lens, when said lens is maintained at a predetermined orientation on or in an eye.

"The distance vision zone being located in the upper portion of the central optical zone" means that at least 60%, preferably, preferably at least 80%, more preferably at least 90%, of the distance vision zone is located in the half central optical zone above the horizontal meridian. It is understood that the distance vision zone can be larger than or smaller than or equal to the half central optical zone above the horizontal meridian.

"The rotationally-asymmetrical progressive zone being located in the lower portion of the central optical zone" means that at least 60%, preferably at least 80%, more preferably at least 90%, of the rotationally-asymmetrical progressive zone is located in the half central optical zone below the horizontal meridian. It is understood that the rotationally-asymmetrical progressive zone can be larger than or smaller than or equal to the half central optical zone below the horizontal meridian.

"The upper boundary of the rotationally-asymmetrical progressive zone" refers to one half peripheral boundary which is above a line parallel to the horizontal meridian and passing through the radial center.

"The lower boundary of the rotationally-asymmetrical progressive zone" refers to one half peripheral boundary which is below a line parallel to the horizontal meridian and passing through the radial center.

FIGS. 1A–1E schematically illustrate a contact lens having an orientation/stabilization feature according to a preferred embodiment of the invention. The contact lens 100 has an anterior surface and an opposite posterior surface. The anterior surface has a mirror symmetry with respect to a vertical meridian plane and is continuous at least in first derivative. The anterior surface comprises a central optical zone 110, a first blending zone 120 surrounding the central optical zone 110, a peripheral zone 130 surrounding the first blending zone 120, a second blending zone 150 surrounding the peripheral zone 130, and an edge zone 160 surrounding the second blending zone 150.

The central optical zone 110 is a circular zone which is concentric with the geometric center of the anterior surface. The central optical zone 110 in combination with the posterior surface provides one or more vision corrections, for example, such as astigmatism, presbyopia, prism, high-order monochromatic aberrations (e.g., a non-standard amount of spherical aberration, coma, etc.), or combinations thereof.

The first blending zone 120 has a surface that ensures that the peripheral zone 130, the first blending zone 120 and the central optical zone 110 are tangent to each other. The first blending zone 120 is preferably defined by a spline-based mathematical function. The first blending zone 120 between the central optical zone and the peripheral zone can decouple the optical features and the mechanical stabilization and translation features of the lens, thus preventing the introduction of prism into the optics.

Figure 1C:
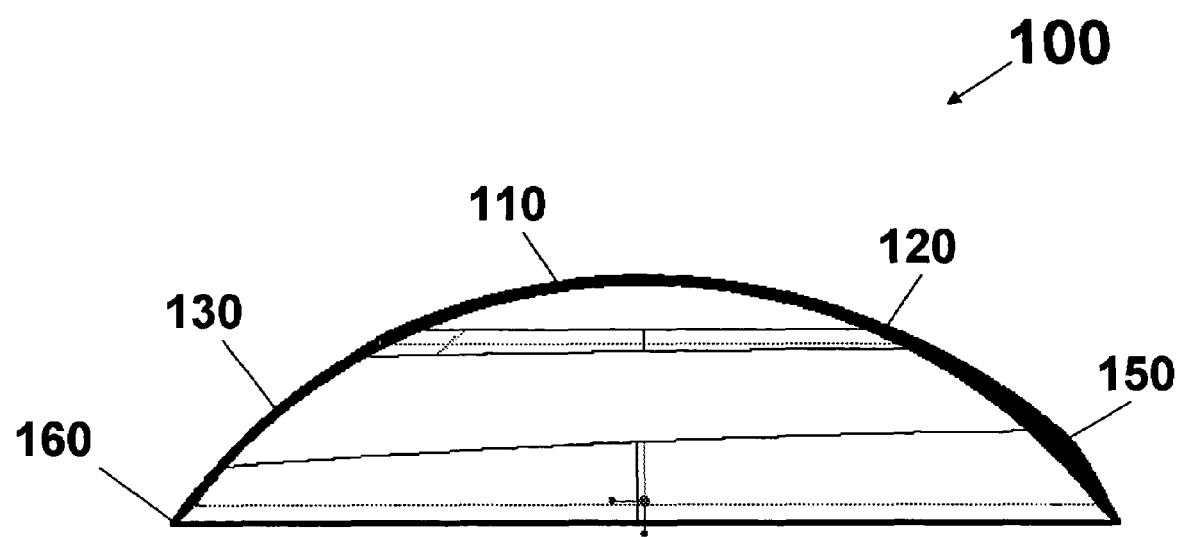
FIG. 1C is a vertical cross-section view of the contact lens shown in FIG. 1A.

The peripheral zone 130 is designed to have a varying lens thickness which depends on positions on the anterior surface. Along the upper portion of the vertical meridian 11, the lens thickness of peripheral zone 130 remains substantially constant or increases gradually from the outer boundary of the peripheral zone to the inner boundary of the peripheral zone in a manner that the difference between two values of lens thickness at two intersection points of the upper portion of the vertical meridian 11 with the outer and inner boundaries of the peripheral zone is preferably less than 30 % (FIG. 1C). Along the lower portion of the vertical meridian 11, the lens thickness of the peripheral zone 130 increases gradually from the inner boundary of the peripheral zone to the outer boundary of the peripheral zone in a manner that the values of lens thickness at two intersection points of the upper portion of the vertical meridian 11 with the outer and inner boundaries of the peripheral zone differ from each other by from about 15% to about 65% (FIGS. 1C and 1E).

Figure 1D:
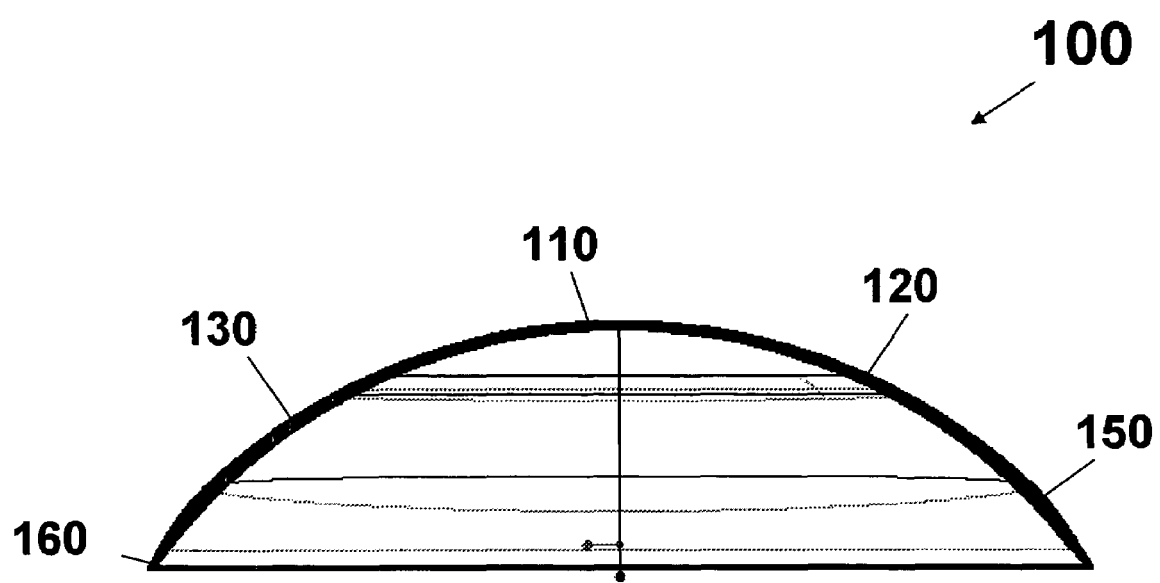
FIG. 1D is a horizontal cross-section view of the contact tens shown in FIG. 1A.
Figure 1E:
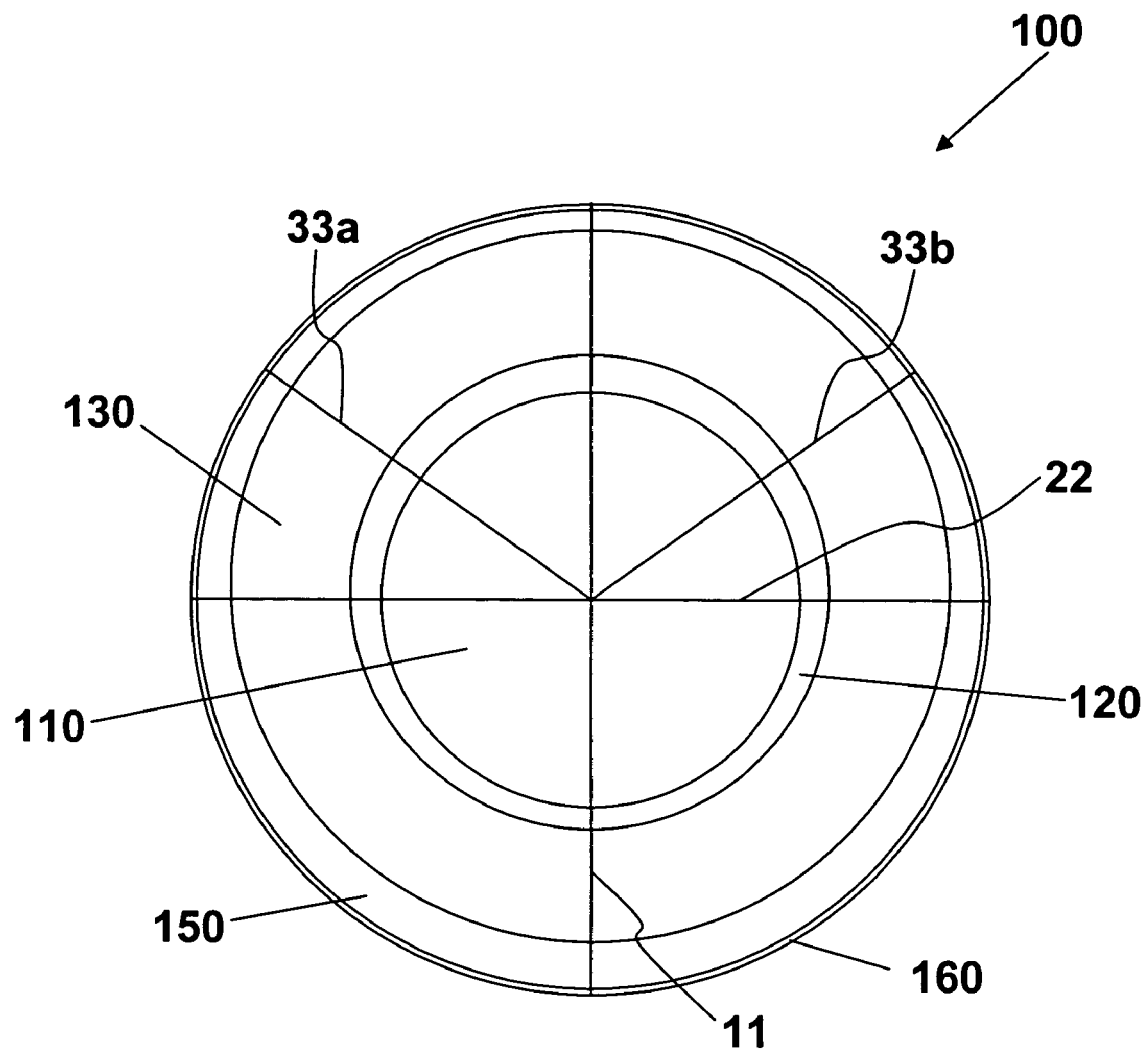
FIG. 1E is a top view (the convex or anterior surface) of the contact lens shown in FIG. 1A.
Figure 2A:
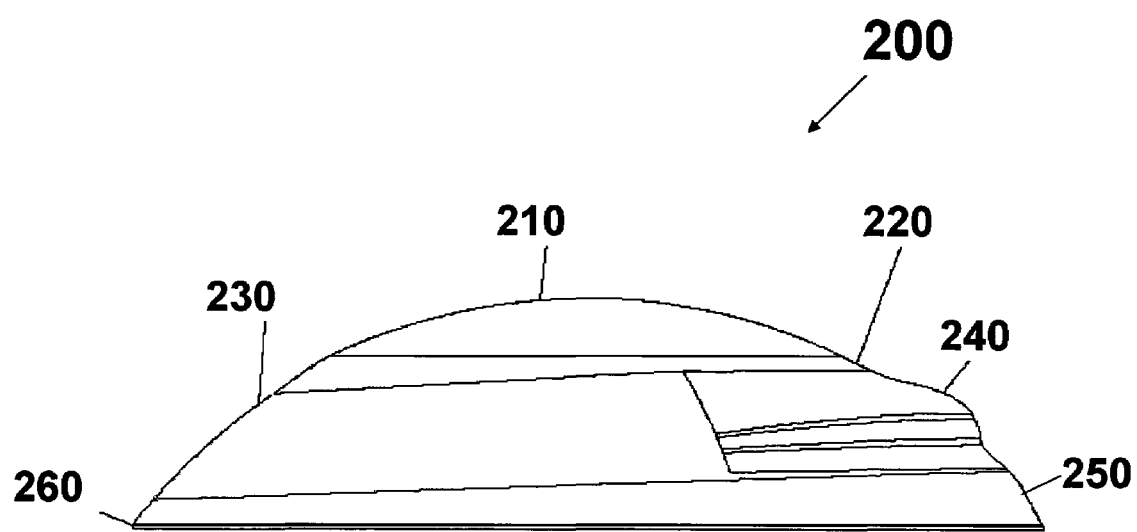
FIG. 2A is side view of a contact lens according to a preferred embodiment of the invention.
Figure 2B:
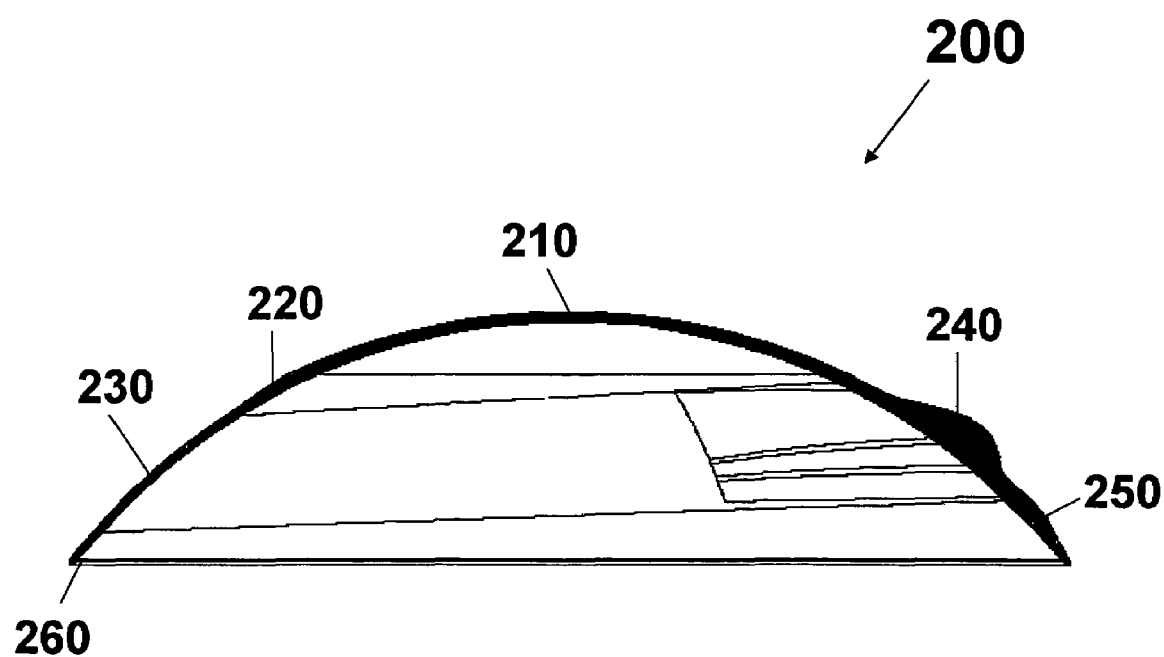
FIG. 2B is a vertical cross-section view of the contact lens shown in FIG. 2A.
Figure 2C:
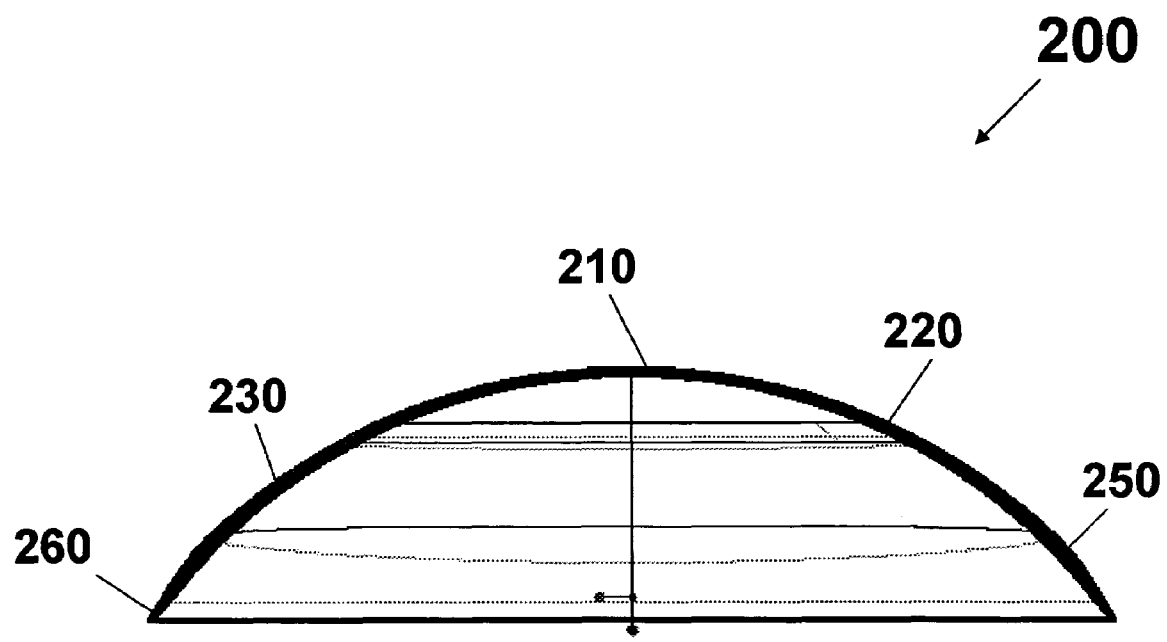
FIG. 2C is a horizontal cross-section view of the contact lens shown in FIG. 2A.
Figure 2D:
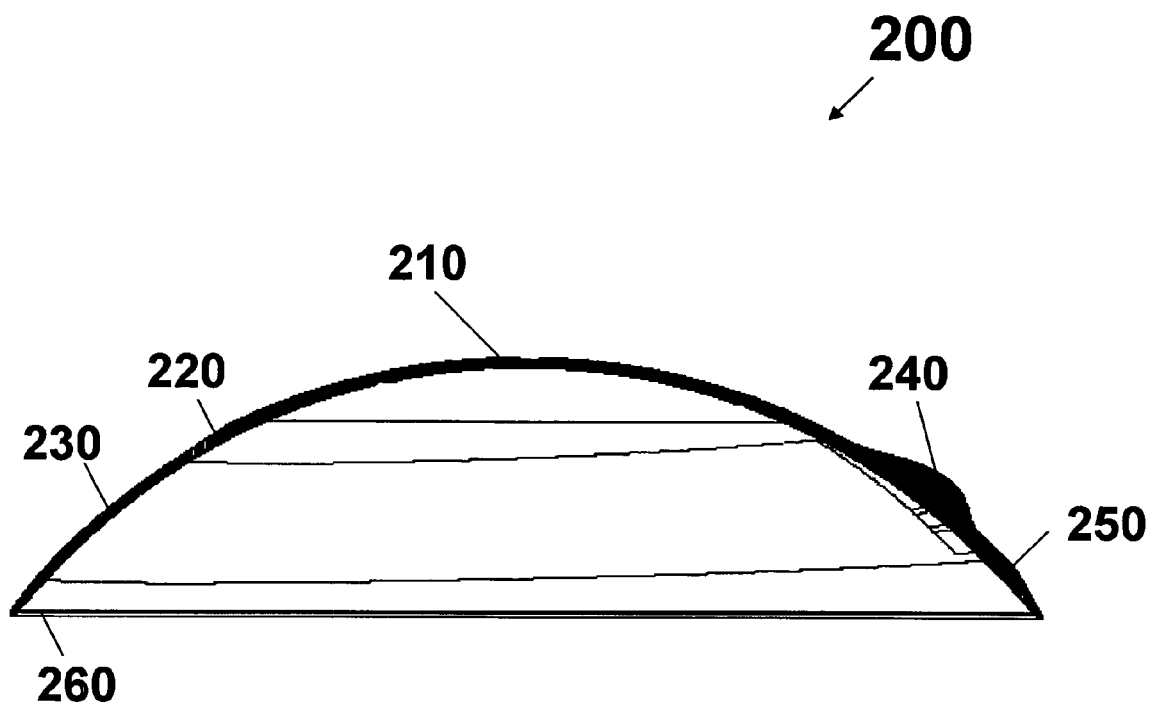
FIG. 2D is a diagonal cross-section view of the contact lens shown in FIG. 2A.

Referring to FIG. 1E, within a sector bounded by two semi-meridians (33a and 33b) preferably about 120 degree relative to the lower portion of the vertical meridian 11 and the edge included between the two semi-meridians 33a and 33b, the lens thickness of the peripheral zone 130 increases gradually along each semi-meridian from the inner boundary to the outer boundary (FIG. 1C and FIG. 1D). Within the other remaining sector (outside of the sector), the lens thickness of the peripheral zone 130 remains substantially constant or increases gradually, along each semi-meridian from the outer boundary of the peripheral zone to the inner boundary of the peripheral zone in a manner that the difference between the values of lens thickness at two intersection points of any semi-meridian with the outer and inner boundaries of the peripheral zone 130 is less than 15%.

The second blending zone 150 is designed to ensure a continuous transition from the peripheral zone 130 to the edge zone. In addition, the second blending zone, in combination with the peripheral zone 130, weigh the lens at its lower half portion, causing it to come to an equilibrium position on the eye.

Lens thickness maximums along semi-meridians are preferably located slightly outside (less than 0.4 mm) of the outer boundary of the peripheral zone 130 within the sector bounded by two semi-meridians 33a and 33b preferably about 120 degree relative to the lower portion of the vertical meridian and the edge included between the two semi-meridians (FIGS. 1C–1E).

The edge zone 160 is preferably circular. It is adjacent to the second blending zone and tapers with the posterior surface along the edge of the contact lens. The edge zone 160, in combination with the posterior surface, provides a substantially uniform thickness which may provide comfortable lens fit on an eye.

FIGS. 2A–2D schematically illustrate a translating contact lens having an orientation/stabilization feature and a translation feature according to a preferred embodiment of the invention. The translating contact lens 200 has an anterior surface and an opposite posterior surface. The anterior surface has a mirror symmetry with respect to a vertical meridian plane and is continuous at least in first derivative. The anterior surface comprises a central optical zone 210, a first blending zone 220 surrounding the central optical zone 110, a peripheral zone 230 surrounding the first blending zone 220, a second blending zone 250 surrounding the peripheral zone 230, and an edge zone 260 surrounding the second blending zone 250.

The central optical zone 210 is a circular zone which is concentric with the geometric center of the anterior surface. The central optical zone 210 comprises a first portion to provide distant vision correction for the eye and a second portion disposed beneath the first portion to provide near vision correction for the eye.

The first blending zone 220, the second blending zone 250 and the edge zone 260 have preferred designs as described above for a contact lens shown in FIGS. 1A–1D.

The peripheral zone 230 includes a ridge 240. The ridge is designed to sit on the peripheral zone 240 having a design almost identical to what described above for a contact lens shown in FIGS. 1A–1D.

The optical zone and non-optical zones (orientation/stabilization and/or translation feature) of a contact lens of the invention are designed separately. A contact lens of the invention can be designed using any known, suitable optical design system. Exemplary optical computer aided design systems for designing an optical model lens includes, but are not limited to ZEMAX (ZEMAX Development Corporation). Preferably, the optical design will be performed using ZEMAX (ZEMAX Development Corporation). The design of the optical model lens can be transformed by, for example, a mechanical computer aided design (CAD) system, into a set of mechanical parameters for making a physical lens. Any know suitable mechanical CAD system can be used in the invention. The design of an optical model lens may be translated back and forth between the optical CAD and mechanical CAD systems using a translation format which allows a receiving system, either optical CAD or mechanical CAD, to construct NURBs (non-uniform rational B-splines), Bezier surfaces of an intended design or ASCII parameters that control a parametric design. Exemplary translation formats include, but are not limited to, VDA (verband der automobilindustrie) and IGES (Initial Graphics Exchange Specification). By using such translation formats, overall surface of lenses can be in a continuous form that facilitates the production of lenses having radial asymmetrical shapes. Bézier and NURBs surface are particular advantageous for a lens having a plurality of zones including optical zone and non-optical zones because multiple zones can be blended, analyzed and optimized. More preferably, the mechanical CAD system is capable of representing precisely and mathematically high order surfaces. An example of such mechanical CAD system is Pro/Engineer from Parametric Technology.

An "optical model lens" refers to an ophthalmic lens that is designed in a computer system and generally does not contain other non-optical features that constitute an ophthalmic lens.

When transforming the design of an optical model lens into a set of mechanical parameters, common feature parameters of a family of ophthalmic lenses can be incorporated in the lens designing process. Examples of such parameters include shrinkage, non-optical boundary zone and its curvature, center thickness, range of optical power, and the like.

Any mathematical function can be used to describe the optical zone and non-optical zones of a contact lens of the invention, as long as they have sufficient dynamic range that allow the design of that lens to be optimized. Exemplary mathematical functions include conic, biconic and quadric functions, polynomials of any degree, Zernike polynomials, exponential functions, trigonometric functions, hyperbolic functions, rational functions, Fourier series, and wavelets. Preferably, a spline-based mathematical function or a combination of two or more mathematical functions are used to describe the optical zone and non-optical zones of a contact lens of the invention.

A contact lens of the invention may be produced by any convenient manufacturing means, including, for example, a computer-controllable manufacturing device, molding or the like. A "computer controllable manufacturing device" refers to a device that can be controlled by a computer system and that is capable of producing directly a contact lens or optical tools for producing a contact lens. Any known, suitable computer controllable manufacturing device can be used in the invention. Exemplary computer controllable manufacturing devices includes, but are not limited to, lathes, grinding and milling machines, molding equipment, and lasers. Preferably, a computer controllable manufacturing device is a two-axis lathe with a 45° piezo cutter or a lathe apparatus disclosed by Durazo and Morgan in U.S. Pat. No. 6,122,999 (herein incorporated by reference in its entirety), or is a numerically controlled lathe, for example, such as Optoform® ultra-precision lathes (models 30, 40, 50 and 80) having Variform® or Varimax piezo-ceramic fast tool servo attachment from Precitech, Inc.

Preferably, contact lenses are molded from contact lens molds including molding surfaces that replicate the contact lens surfaces when a lens is cast in the molds. For example, an optical cutting tool with a numerically controlled lathe may be used to form a metallic optical tool incorporating the features of the anterior surface of a contact lens of the invention. The tool is then used to make anterior surface molds that are then used, in conjunction with posterior surface molds, to form the lens of the invention using a suitable liquid lens-forming material placed between the molds followed by compression and curing of the lens-forming material.

Preferably, a contact lens of the invention or the optical tool to be used for making the same is fabricated by using a numerically controlled lathe, for example, such as Optoform® ultra-precision lathes (models 30, 40, 50 and 80) having Variform® or Varimax piezo-ceramic fast tool servo attachment from Precitech, Inc, according to a method described in a co-pending U.S. Patent Application of CibaVision, entitled "Method for Manufacturing a contact lens", (U.S. Ser. No. 60/398,495, filed on Jul. 24, 2002), herein incorporated by reference in its entirety.

As an illustrative example, production of a translating contact lens shown in FIGS. 2A–2D is created via the following process. First, a user defines a set of parameters, such as a surface tolerance, a concentricity tolerance, orientation of the lens design, the number of semi-diameter spokes to be generated for each of the anterior and posterior surfaces, creating zero point at 0,0, orientation of Z-axis, and type of lens surface (concave or convex surface) to be converted into a geometry. A "surface tolerance" refers to the allowed position-deviation of a projected point from an ideal position on a surface of a lens design. The deviation can be in the direction either parallel or perpendicular to the central axis of a lens design. A "concentricity tolerance" refers to the allowed deviation of a point from a given arc. A "semi-diameter spoke" refers to a curve radiating outwardly from the central axis and is perpendicular to the central axis and projected onto the surface. "Evenly-spaced semi-diameter spokes" means that all semi-diameter spokes radiate outwardly from the central axis and separate from each other by one equal angle. A "point spacing" refers to a distance between two points along the semi-diameter spoke.

Second, a user determines the point density to be projected onto the surface of the lens design (for example, the anterior surface) along each of the number of evenly-spaced semi-diameter spokes in a direction parallel to the central axis. A semi-diameter spoke at an azimuthal angle corresponds to the feature that deviates most from the base conic surface, and is selected as the semi-diameter probing spoke. Evenly-spaced points are projected along the semi-diameter probing spoke, in which each pairs of points are separating by a point spacing of typically 10 microns. Then all of the projected points are divided into a series of groups, with each group composed of three consecutive points, a first point, a middle point, and a third point. Each of the points can belong to either one group or two groups. One group is analyzed at a time from the central axis to the boundary, or from the boundary to the central axis, from the curvature of the surface at the middle point of the group by comparing a distance between the middle point and a line linking the first point and the third point of the corresponding group with the predetermined surface tolerance. If the distance between the middle point and the line linking the first and third points of the group is larger than the predetermined surface tolerance, the curvature of the surface at that point is sharp and an additional point is projected between the first and the middle points in that group. The point spacing between the first and additional points is equal to point spacing between the additional and middle points. After adding an additional point, all of the points included the newly added point is regrouped again and the curvature of the surface at the middle point of each of the series of groups is analyzed. Such iterative procedure is repeated until the distance between the middle point of each of the series of groups and the line linking the first and the third points of corresponding group along the probing spoke is equal to or less than the predetermined surface tolerance. In this manner, the number of the points to be projected onto the surface of the lens design along each of the desired number of evenly-spaced semi-diameter spokes and point spacing for a series of pairs of neighboring points are determined.

The above-determined number of points is then projected onto the anterior surface of the lens design along each of 24, 96 or 384 semi-diameter spokes, in the preferred embodiment. Other numbers of spokes are possible. For each of the semi-diameter spokes, a semi-meridian that is continuous in first derivative is generated. The semi-meridian includes a series of arcs and, optionally, straight lines wherein each arc is defined by fitting at least three consecutive points into a spherical mathematical function within a desired concentricity tolerance. Each of the straight lines is obtained by connecting at least three consecutive points. Preferably, the arc-fitting routine is started from the central axis to the boundary. Similarly, conversion of the posterior surface of the lens design into geometry can be carried out according to the above-described procedure.

After converting the lens design to geometry of a contact lens to be produced in a manufacturing system, a mini-file, or equivalent format, containing both the information for the header and the information about the geometry of the lens is generated. This mini-file also contains a zero semi-meridian that is based on the average height of each of the other meridians at each of radial locations and that gives the Variform or Varimax a zero position on which it can base its oscillation calculations. In this mini-file, all semi-meridians have the same number of zones. This is accomplished by copying the last zone of a semi-meridian for a number of times to equalize the numbers of zones for all meridians. After the mini-file is completed, it is loaded into an Optoform® ultra-precision lathe (models 30, 40, 50 or 80) having Variform® piezo-ceramic fast tool servo attachment and run to produce a translating contact lens.

A contact lens of the invention can be characterized by any known suitable optical metrology system. The vertically oriented coma-like and other wavefront aberrations of the lens can be determined by any suitable methods known to one skilled in the art, including without limitation, Shack-Hartmann techniques, Tscherning techniques, retinal ray tracing techniques, and spatially-resolved refractometer techniques.

The present invention also provides a method of manufacturing an ophthalmic lens of the invention.

The invention, in another aspect, provides a method for producing a contact lens having an orientation/stabilization feature of the invention as described above. The method comprises the steps of designing the anterior surface and the posterior surface of the contact lens, wherein anterior surface includes: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone. The anterior surface has a mirror symmetry with respect to a vertical meridian plane and is continuous at least in first derivative. The contact lens is weighed at its lower half portion by varying lens thickness within the peripheral zone and second blending zone to cause it to come to an equilibrium position on the eye and has a lens thickness profile characterized by that the lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the peripheral zone along each semi-meridian until reaching a lens thickness maximum and then decreases. The central optical zone is designed independently from the peripheral zone and then blended with the peripheral zone by using the first blending zone.

In a preferred embodiment, the lens thickness profile is further charaterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%, preferably by less than 30%, more preferably less than 15%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

The manufacturing method of the invention preferably further comprises a step of producing an ophthalmic lens by a manufacturing means as described above.

The invention, in a further aspect, provides a series of contact lenses capable of correcting different vision deficiencies, wherein each contact lens in the series comprises an anterior surface and a posterior surface, wherein the posterior surface of each lens in the series is substantially identical to each other, wherein the anterior surface of each lens in the series include: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone, wherein the peripheral zone, the second blending zone and the edge zone of each lens in the series is identical to each other whereas the central optical zone and the first blending zone of each lens in the series are different from each other. The anterior surface of each lens has a mirror symmetry with respect to a vertical meridian plane and is continuous at least in first derivative. Each lens is weighed at its lower half portion by varying lens thickness within the peripheral zone and second blending zone to cause it to come to an equilibrium position on the eye and has a lens thickness profile characterized by that lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the peripheral zone along each semi-meridian until reaching a lens thickness maximum and then decreases.

In a preferred embodiment, the lens thickness profile is further charaterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%, preferably by less than 30%, more preferably less than 15%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

The invention, in another further aspect, provides a method for producing a series of contact lenses which each correct different vision difficiencies. The method comprises the steps of: designing the anterior surface and the posterior surface of the contact lens, wherein the posterior surface of each lens in the series is substantially identical to each other, wherein the anterior surface of each lens in the series include: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone, wherein the peripheral zone, the second blending zone and the edge zone of each lens in the series is identical to each other whereas the central optical zone and the first blending zone of each lens in the series are different from each other. The anterior surface of each lens has a mirror symmetry with respect to a vertical meridian plane and is continuous at least in first derivative. Each lens is weighed at its lower half portion by varying lens thickness within the peripheral zone and second blending zone to cause it to come to an equilibrium position on the eye and has a lens thickness profile characterized by that lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the peripheral zone along each semi-meridian until reaching a lens thickness maximum and then decreases. The central optical zone is designed independently from the peripheral zone and then blended with the peripheral zone by using the first blending zone.

In a preferred embodiment, the lens thickness profile is further charaterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%, preferably by less than 30%, more preferably less than 15%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A contact lens, comprising a posterior surface and an opposite anterior surface,
   wherein the anterior surface includes a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone;
   wherein the anterior surface has a mirror symmetry with respect to a vertical meridian plane and is continuous at least in first derivative,
   wherein contact lens is weighed at its lower half portion by varying lens thickness within the peripheral zone and second blending zone to cause it to come to an equilibrium position on the eye, and
   wherein the contact lens has a lens thickness profile characterized by that lens thickness, in a sector bounded by two sector-bounding semi-meridians at an equal angle of from about 35 degrees to about 135 degrees relative to the lower portion of the vertical meridian and by a portion of the edge included between the two sector-bounding semi-meridians, increases gradually from the inner boundary of the peripheral zone along each semi-meridian until reaching a lens thickness maximum and then decreases.

2. A contact lens of claim 1, wherein the lens thickness profile is further characterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

3. A contact lens of claim 2, wherein the central optical zone is a circular zone the center of which is on the vertical meridian and about 2.0 mm or less from the geometric center of the anterior surface.

4. A contact lens of claim 3, wherein the central optical zone is a circular zone which is concentric with the geometric center of the anterior surface or.

5. A contact lens of claim 2, wherein the lens thickness of the contact lens has value ranging between about 110 to about 150 micrometers in the peripheral zone along the upper portion of the vertical meridian.

6. A contact lens of claim 2, wherein lens thickness at the intersection point of the lower portion of the vertical meridian with the inner boundary of the peripheral zone is from about 200 micrometers to about 280 micrometers; lens thickness at the intersection point of the lower portion of the vertical meridian with the outer boundary of the peripheral zone is from about 320 micrometers to about 400 micrometers wherein lens thickness maximums along semi-meridians are located slightly inside of, alone or slightly outside of the outer boundary of the peripheral zone within the sector.

7. A contact lens of claim 2, wherein lens thickness maximums along semi-meridians are located slightly inside of, alone or slightly outside of the outer boundary of the peripheral zone within the sector.

8. A contact lens of claim 7, wherein the lens thickness maximums along semi-meridians are located slightly outside of and at 0.4 mm or less from the outer boundary of the peripheral zone within the sector.

9. A contact lens of claim 7, wherein the two sector-bounding semi-meridians are at about 90 degrees relative to the lower portion of the vertical meridian.

10. A contact lens of claim 7, wherein the two sector-bounding semi-meridians are at about 120 degrees relative to the lower portion of the vertical meridian.

11. A contact lens of claim 10, wherein along each semi-meridian within the other remaining sector lens thickness remains substantially constant or increases gradually from the outer boundary of the peripheral zone to the inner boundary of the peripheral zone in a manner that the difference between the values of lens thickness at two intersection points of any semi-meridian with the outer and inner boundaries of the peripheral zone is less than 15%.

12. A contact lens of claim 11, wherein the lens thickness maximums along semi-meridians are located slightly outside of and at 0.4 mm or less from the outer boundary of the peripheral zone within the sector.

13. A contact lens of claim 2, wherein distances between the edge of the lens and any points along the outer boundary of the peripheral zone within the sector are from about 0.6 mm to about 2.0 mm.

14. A contact lens of claim 2, wherein at least one of the peripheral zone, the first blending zone and the second blending zone is defined by a spline-based mathematical function or polynomial function or is made of several different surface patches.

15. A contact lens of claim 14, wherein the contact lens is a toric, multifocal, toric multifocal or customized contact lens.

16. A contact lens of claim 2, wherein the peripheral zone further comprises a ridge feature disposed below the central optical zone and extending outwardly from the peripheral zone to enable engagement with a lower eyelid of a user and thereby provide vertical translation support for the contact lens when being worn by the user.

17. A contact lens of claim 16, wherein the ridge feature is a ramped ridge which includes an upper boundary, a lower ramped boundary, a latitudinal ridge that extends outwardly from the anterior surface, and a ramp that extends downwardly from the lower ramped boundary and has a curvature or slope that provides a varying degree of interaction between the ramped ridge zone and the lower eyelid of an eye depending on where the lower eyelid strikes the ramped ridge zone.

18. A contact lens of claim 16, wherein the maximum lens thickness of the ridge feature is from about 400 micrometers to about 600 micrometers.

19. A contact lens of claim 17, wherein the ramped ridge has a flattened lower ramp edge and a flattened latitudinal ridge.

20. A contact lens of claim 17, wherein the ramped ridge has two bumps formed at the two end of the latitudinal ridge the elevation height of which are higher at the both ends than in the middle.

21. A contact lens of claim 2, wherein the central optical zone has at least a first optical zone for primary gaze, a second optical zone for down-gaze and an optical blending zone between the first and second optical zones, wherein the first optical zone is located in the upper portion of the central optical zone and the second optical zone is located in the lower portion of the central optical zone, and wherein the optical blending zone has a surface that ensures a smooth surface transition from the first optical zone to the second optical zone and that allows the first and second optical zone to be designed independently and optimally so that ghost images or blur from the first and second optical zones is minimized or eliminated.

22. A contact lens of claim 21, wherein the apex of the first optical zone coincides with the center of the central optical zone, wherein the vertex center of the second optical zone is located at the intersection point of the vertical meridian with its boundary line with the optical blending zone, and the distance between the vertex center of the second optical zone and the apex of the first optical zone is 1.5 mm or less.

23. A contact lens of claim 22, wherein a first line passing through the vertex center of the second optical zone and the center of curvature at the vertex center of the second optical zone intersects a second line passing through the apex of the first optical zone and the center of curvature at the apex of the posterior surface, wherein the intersection point is within 2 mm or less of the center of curvature at the apex of the base optical surface.

24. A contact lens of claim 22, wherein the surface of the optical blending zone has a localized curvature or optical power much higher than either of the first and second optical zones so that axial light will refract light from the macular region of the eye of the wearer, and wherein the width of the optical blending zone increases from the vertical meridian to the periphery of the central optical zone.

25. A contact lens of claim 2, wherein the central optical zone comprises a toric optics feature or a multifocal optics feature or combination thereof.

26. A contact lens of claim 25, wherein the multifocal optics feature is a progressive power zone which is substantially concentric with the central axis and has a diameter of from about 1.0 mm to about 2.5 mm.

27. A contact lens of claim 2, wherein the central optical zone provides a coma-like wavefront aberration oriented vertically from the top to the bottom of the lens.

28. A contact lens of claim 2, wherein the central optical zone has an asymmetrical surface, and wherein the central optical zone has an optical power increasing from the top to the bottom of the central optical zone.

29. A contact lens of claim 28, wherein the central optical zone is described by a combination of a biconic or conic mathematical function with at least one vertically oriented coma-like Zernike term or equivalents thereof.

30. A contact lens of claim 29, wherein the magnitude of coefficient of the vertically oriented Zernike coma term, based on the proposed OSA Zernike standard, is between about 0.1 µm RMS (root-mean-square) and about 2 µm RMS at a 6 mm diameter optical zone.

31. A contact lens of claim 29, wherein said at least one vertically oriented coma-like Zernike term is a vertically oriented third order coma-like Zernike term Z7, a vertically oriented fifth order coma-like Zernike term Z17, a vertically oriented seventh order coma-like term Z31 (based on the proposed OSA Standard Zernike Polynomials) or combinations thereof.

32. A contact lens of claim 3, wherein the central optical zone has a distance vision zone and a rotationally-asymmetrical progressive zone adjacent to the distance vision zone, wherein the distance vision zone is located in the upper portion of the central optical zone and provides a distance power for distance vision correction, wherein the rotationally-asymmetrical progressive zone is located in the lower portion of the central optical zone and provides a variable intermediate vision correction and near vision correction.

33. A contact lens of claim 32, wherein the rotationally-asymmetrical progressive zone has an upper boundary, a lower boundary, a radial center, an upper vertically radiating semi-meridian and a lower vertically radiating semi-meridian, and wherein the rotationally-asymmetrical progressive zone further has a surface that provides a power profile that increases, along the upper vertically radiating semi-meridian, from the distance power at the upper boundary to a near power at the radial center and remains substantially constant from the radial center to a point near the lower boundary along the lower vertically radiating semi-meridian.

34. A contact lens of claim 33, wherein the distance zone extends downwardly from the top boundary of the central optical zone; wherein the lower boundary line of the distance zone with the rotationally-asymmetrical progressive zone is at or slightly above a horizontal line passing through the center of the central optical zone and parallel with the horizontal meridian, at least in its central portion.

35. A contact lens of claim 33, wherein the radial center is located below the center of the central optical zone and on the vertical meridian, and wherein the distance between the radial center and the optical axis of the lens is about 2.0 mm or less.

36. A contact lens of claim 33, wherein the rotationally-asymmetrical progressive zone is tangent to the distance vision zone at any point along the upper and lower boundaries of the rotationally-asymmetrical progressive zone.

37. A contact lens of claim 33, wherein the rotationally-asymmetrical progressive zone has a surface that provides a power addition profile, along the upper vertically radiating semi-meridian, which is defined by two or more linear functions of equation (1) or by equation (2) or equation (3)

$$\begin{cases} p(x) = b_1 + k_1 x & 0 \leq x < x_1 \\ p(x) = b_2 + k_2 x & x_1 \leq x < x_2 \\ \quad \vdots \\ p(x) = b_i + k_i x & x_{i-1} \leq x < x_i \\ \quad \vdots \end{cases} \quad (1)$$

$$p(x) = \frac{A}{2} \cdot \cos\left(\frac{x}{X_o}\pi\right) + \frac{A}{2} \quad (2)$$

$$p(x) = A \cdot \left[1 - \left(\frac{x}{X_o}\right)^n\right] \quad (3)$$

in which p(x) is an added power at a radial distance of x from the radial center; $b_i$ is a coefficient which is the intercept of a linear line; $k_i$ is the rate of change of the added power as function of the distance from the radial center; A is the maximum added power; $X_o$ is a radial distance between the radial center and the optical axis; and n is any number which can be an integer or non-integer larger than 1 but smaller than or equal to 10.

38. A method of producing a contact lens, comprising the steps of designing the anterior surface and the posterior surface of the contact lens,
    wherein the anterior surface includes a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone,
    wherein the anterior surface has a mirror symmetry with respect to a vertical meridian plane and is continuous at least in first derivative,
    wherein contact lens is weighed at its lower half portion by varying lens thickness within the peripheral zone and second blending zone to cause it to come to an equilibrium position on the eye, and
    wherein the contact lens has a lens thickness profile characterized by that lens thickness, in a sector bounded by two sector-bounding semi-meridians at an equal angle of from about 35 degrees to about 135 degrees relative to the lower portion of the vertical meridian and by a portion of the edge included between the two sector-bounding semi-meridians, increases gradually from the inner boundary of the peripheral zone along each semi-meridian until reaching a lens thickness maximum and then decreases.

39. A method of claim 38, wherein the lens thickness profile is further charaterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

40. A method of claim 39, wherein the central optical zone is a circular zone the center of which is on the vertical meridian and about 2.0 mm or less from the geometric center of the anterior surface.

41. A method of claim 40, wherein the lens thickness of the contact lens has value ranging between about 110 to about 150 micrometers in the peripheral zone along the upper portion of the vertical meridian.

42. A method of claim 40, wherein lens thickness at the intersection point of the lower portion of the vertical meridian with the inner boundary of the peripheral zone is from about 200 micrometers to about 280 micrometers; lens thickness at the intersection point of the lower portion of the vertical meridian with the outer boundary of the peripheral zone is from about 320 micrometers to about 400 micrometers wherein lens thickness maximums along semi-meridians are located slightly inside of, alone or slightly outside of the outer boundary of the peripheral zone within the sector.

43. A method of claim 40, wherein lens thickness maximums along semi-meridians are located slightly inside of, alone or slightly outside of the outer boundary of the peripheral zone within the sector.

44. A method of claim 43, wherein the lens thickness maximums along semi-meridians are located slightly outside of and at 0.4 mm or less from the outer boundary of the peripheral zone within the sector.

45. A method of claim 44, wherein the two sector-bounding semi-meridians are at about 90 degrees relative to the lower portion of the vertical meridian.

46. A method of claim 44, wherein the two sector-bounding semi-meridians are at about 120 degrees relative to the lower portion of the vertical meridian.

47. A method of claim 46, wherein along each semi-meridian within the other remaining sector lens thickness remains substantially constant or increases gradually from the outer boundary of the peripheral zone to the inner boundary of the peripheral zone in a manner that the difference between the values of lens thickness at two intersection points of any semi-meridian with the outer and inner boundaries of the peripheral zone is less than 15%.

48. A method of claim 43, wherein distances between the edge of the lens and any points along the outer boundary of the peripheral zone within the sector are from about 0.6 mm to about 2.0 mm.

49. A method of claim 43, wherein at least one of the peripheral zone, the first blending zone and the second blending zone is defined by a spline-based mathematical function or polynomial function or is made of several different surface patches.

50. A method of claim 40, further comprising the steps of producing the ophthalmic lens by a manufacturing means.

51. A method of claim 40, wherein the peripheral zone further comprises a ridge feature disposed below the central optical zone and extending outwardly from the peripheral zone to enable engagement with a lower eyelid of a user and thereby provide vertical translation support for the contact lens when being worn by the user.

52. A method of claim 51, wherein the ridge feature is a ramped ridge which includes an upper boundary, a lower ramped boundary, a latitudinal ridge that extends outwardly from the anterior surface, and a ramp that extends downwardly from the lower ramped boundary and has a curvature or slope that provides a varying degree of interaction between the ramped ridge zone and the lower eyelid of an eye depending on where the lower eyelid strikes the ramped ridge zone.

53. A method of claim 51, wherein the maximum lens thickness of the ridge feature is from about 400 micrometers to about 600 micrometers.

54. A method of claim 53, wherein the ramped ridge has a flattened lower ramp edge and a flattened latitudinal ridge.

55. A method of claim 53, wherein the ramped ridge has two bumps formed at the two end of the latitudinal ridge the elevation height of which are higher at the both ends than in the middle.

56. A method of claim 51, further comprising the steps of producing the ophthalmic lens by a manufacturing means.

57. A method of claim 56, wherein the manufacturing means is a computer-controllable manufacturing device.

58. A method of claim 57, wherein the computer controllable manufacturing device is a numerically controlled lathe.

59. A series of contact lenses, each contact lens in the series comprising an anterior surface and a posterior surface,
  wherein the posterior surface of each lens in the series is substantially identical to each other,
  wherein the anterior surface of each lens in the series include: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone,
  wherein the peripheral zone, the second blending zone and the edge zone of each lens in the series is identical to each other whereas the central optical zone and the first blending zone of each lens in the series are different from each other,
  wherein the anterior surface of each lens has a mirror symmetry with respect to a vertical meridian plane and is continuous at least in first derivative,
  wherein each lens is weighed at its lower half portion by varying lens thickness within the peripheral zone and second blending zone to cause it to come to an equilibrium position on the eye, and
  wherein each lens has a lens thickness profile characterized by that lens thickness, in a sector bounded by two sector-bounding semi-meridians at an equal angle of from about 35 degrees to about 135 degrees relative to the lower portion of the vertical meridian and by a portion of the edge included between the two sector-bounding semi-meridians, increases gradually from the inner boundary of the peripheral zone along each semi-meridian until reaching a lens thickness maximum and then decreases.

60. A series of contact lenses of claim 59, wherein the lens thickness profile is further charaterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

61. A series of contact lenses of claim 60, wherein the central optical zone is a circular zone the center of which is on the vertical meridian and about 2.0 mm or less from the geometric center of the anterior surface.

62. A series of contact lenses of claim 60, wherein the lens thickness of the contact lens has value ranging between about 110 to about 150 micrometers in the peripheral zone along the upper portion of the vertical meridian.

63. A series of contact lenses of claim 60, wherein lens thickness at the intersection point of the lower portion of the vertical meridian with the inner boundary of the peripheral zone is from about 200 micrometers to about 280 micrometers; lens thickness at the intersection point of the lower portion of the vertical meridian with the outer boundary of the peripheral zone is from about 320 micrometers to about 400 micrometers.

64. A series of contact lenses of claim 60, wherein lens thickness maximums along semi-meridians are located slightly inside of, alone or slightly outside of the outer boundary of the peripheral zone within the sector.

65. A series of contact lenses of claim 64, wherein the lens thickness maximums along semi-meridians are located slightly outside of and at 0.4 mm or less from the outer boundary of the peripheral zone within the sector.

66. A series of contact lenses of claim 64 wherein the two sector-bounding semi-meridians are at about 90 degrees relative to the lower portion of the vertical meridian.

67. A series of contact lenses of claim 64, wherein the two sector-bounding semi-meridians are at about 120 degrees relative to the lower portion of the vertical meridian.

68. A series of contact lenses of claim 67, wherein along each semi-meridian within the other remaining sector lens thickness remains substantially constant or increases gradually from the outer boundary of the peripheral zone to the inner boundary of the peripheral zone in a manner that the difference between the values of lens thickness at two intersection points of any semi-meridian with the outer and inner boundaries of the peripheral zone is less than 15%.

69. A series of contact lenses of claim 68, wherein the lens thickness maximums along semi-meridians are located slightly outside of and at 0.4 mm or less from the outer boundary of the peripheral zone within the sector.

70. A series of contact lenses of claim 60, wherein distances between the edge of the lens and any points along the outer boundary of the peripheral zone within the sector are from about 0.6 mm to about 2.0 mm.

71. A series of contact lenses of claim 60, wherein at least one of the peripheral zone, the first blending zone and the second blending zone is defined by a spline-based mathematical function or polynomial function or is made of several different surface patches.

72. A series of contact lenses of claim 60, wherein the peripheral zone further comprises a ridge feature disposed below the central optical zone and extending outwardly from the peripheral zone to enable engagement with a lower eyelid of a user and thereby provide vertical translation support for the contact lens when being worn by the user.

73. A series of contact lenses of claim 72, wherein the ridge feature is a ramped ridge which includes an upper boundary, a lower ramped boundary, a latitudinal ridge that extends outwardly from the anterior surface, and a ramp that extends downwardly from the lower ramped boundary and has a curvature or slope that provides a varying degree of interaction between the ramped ridge zone and the lower eyelid of an eye depending on where the lower eyelid strikes the ramped ridge zone.

74. A series of contact lenses of claim 72, wherein the maximum lens thickness of the ridge feature is from about 400 micrometers to about 600 micrometers.

75. A series of contact lenses of claim 73, wherein the ramped ridge has a flattened lower ramp edge and a flattened latitudinal ridge.

76. A series of contact lenses of claim 73, wherein the ramped ridge has two bumps formed at the two end of the latitudinal ridge the elevation height of which are higher at the both ends than in the middle.

77. A method for producing a series of contact lenses, comprising the steps of designing the anterior surface and the posterior surface of the contact lens,
wherein the posterior surface of each lens in the series is substantially identical to each other,
wherein the anterior surface of each lens in the series include: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone,
wherein the peripheral zone, the second blending zone and the edge zone of each lens in the series is identical to each other whereas the central optical zone and the first blending zone of each lens in the series are different from each other,
wherein the anterior surface of each lens has a mirror symmetry with respect to a vertical meridian plane and is continuous at least in first derivative,
wherein each lens is weighed at its lower half portion by varying lens thickness within the peripheral zone and second blending zone to cause it to come to an equilibrium position on the eye,
wherein each lens has a lens thickness profile characterized by that lens thickness, in a sector bounded by two sector-bounding semi-meridians at an equal angle of from about 35 degrees to about 135 degrees relative to the lower portion of the vertical meridian and by a portion of the edge included between the two sector-bounding semi-meridians, increases gradually from the inner boundary of the peripheral zone along each semi-meridian until reaching a lens thickness maximum and then decreases, and
wherein the central optical zone is designed independently from the peripheral zone and then blended with the peripheral zone by using the first blending zone.

78. A method of claim 77, wherein the lens thickness profile is further charaterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%, preferably by less than 30%, more preferably less than 15%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

79. A method of claim 78, wherein the central optical zone is a circular zone the center of which is on the vertical meridian and about 2.0 mm or less from the geometric center of the anterior surface.

* * * * *